(12) United States Patent
Brune et al.

(10) Patent No.: US 8,659,298 B2
(45) Date of Patent: *Feb. 25, 2014

(54) ADVANCED STEERING TOOL SYSTEM, METHOD AND APPARATUS

(75) Inventors: Guenter W. Brune, Bellevue, WA (US); Albert W. Chau, Woodinville, WA (US); Rudolf Zeller, Seattle, WA (US); John E. Mercer, Gig Harbor, WA (US)

(73) Assignee: Merlin Technology, Inc., Kent, WA (US)

( * ) Notice: Subject to any disclaimer, the term of this patent is extended or adjusted under 35 U.S.C. 154(b) by 625 days.

This patent is subject to a terminal disclaimer.

(21) Appl. No.: 12/816,250

(22) Filed: Jun. 15, 2010

(65) Prior Publication Data

US 2010/0253537 A1    Oct. 7, 2010

Related U.S. Application Data

(63) Continuation of application No. 11/835,154, filed on Aug. 7, 2007, now Pat. No. 7,775,301.

(51) Int. Cl.
*G01V 3/08* (2006.01)
*E21B 7/04* (2006.01)

(52) U.S. Cl.
USPC ............... 324/326; 324/67; 324/329; 175/61

(58) Field of Classification Search
USPC .................................................. 324/67, 326
See application file for complete search history.

(56) References Cited

U.S. PATENT DOCUMENTS

| | | |
|---|---|---|
| 3,046,549 A | 7/1962 | Kalmus |
| 3,121,228 A | 2/1964 | Kalmus |
| 3,868,565 A | 2/1975 | Kuipers |
| 3,876,831 A | 4/1975 | Wickham et al. |
| 3,983,474 A | 9/1976 | Kuipers |
| 4,812,812 A | 3/1989 | Flowerdew et al. |
| 5,002,137 A | 3/1991 | Dickenson et al. |
| 5,258,755 A | 11/1993 | Kuckes |
| 5,320,180 A | 6/1994 | Ruley et al. |
| 5,513,710 A | 5/1996 | Kuckes |
| 5,515,931 A | 5/1996 | Kuckes |
| 5,585,726 A | 12/1996 | Chau |
| 5,589,775 A | 12/1996 | Kuckes |

(Continued)

OTHER PUBLICATIONS

Bruin et al, "Most Accurate Drilling Guidance by Dead-Reckoning using High Precision Optical Gyroscopes", Presented Nov. 2, 2006 at No-Dig 2006 in Brisbane, Australia.

(Continued)

*Primary Examiner* — Bot Ledynh
(74) *Attorney, Agent, or Firm* — Pritzkau Patent Group, LLC

(57) ABSTRACT

A steering tool is movable by a drill string to form an underground bore along an intended path. A sensing arrangement of the steering tool detects its pitch and yaw orientations at a series of spaced apart positions along the bore, each position is characterized by a measured extension of the drill string. The steering tool further includes a receiver. At least one marker is positioned proximate to the intended path, for transmitting a rotating dipole field to expose a portion of the intended path to the field for reception by the receiver. The detected pitch orientation, the detected yaw orientation and the measured extension of the drill string are used in conjunction with magnetic information from the receiver to locate the steering tool. The steering tool may automatically use the magnetic information when it is available. A customized overall position determination accuracy can be provided along the intended path.

11 Claims, 15 Drawing Sheets

(56) References Cited

U.S. PATENT DOCUMENTS

| | | |
|---|---|---|
| 5,646,524 A | 7/1997 | Gilboa |
| 5,646,525 A | 7/1997 | Gilboa |
| 5,657,826 A | 8/1997 | Kuckes |
| 6,223,826 B1 | 5/2001 | Chau et al. |
| 6,285,190 B1 | 9/2001 | Brune et al. |
| 6,380,732 B1 | 4/2002 | Gilboa |
| 6,466,020 B2 | 10/2002 | Kuckes et al. |
| 6,496,008 B1 | 12/2002 | Brune et al. |
| 6,615,155 B2 | 9/2003 | Gilboa |
| 6,626,252 B1 | 9/2003 | Kuckes |
| 6,727,704 B2 | 4/2004 | Brune et al. |
| 6,736,222 B2 | 5/2004 | Kuckes et al. |
| 6,814,163 B2 | 11/2004 | Kuckes |
| 6,868,921 B2 | 3/2005 | Burrows et al. |
| 7,055,601 B2 | 6/2006 | Barrow |
| 7,219,749 B2 | 5/2007 | Kuckes |
| 2001/0038354 A1 | 11/2001 | Gilboa |
| 2002/0005719 A1 | 1/2002 | Gilboa et al. |
| 2002/0062203 A1 | 5/2002 | Gilboa |
| 2005/0077085 A1 | 4/2005 | Zeller et al. |

OTHER PUBLICATIONS

Applied Physics, "Model 175 Steering Tool System User's Manual and Technical Guide", Jan. 2004, Applied Physics (Mountain View, CA).

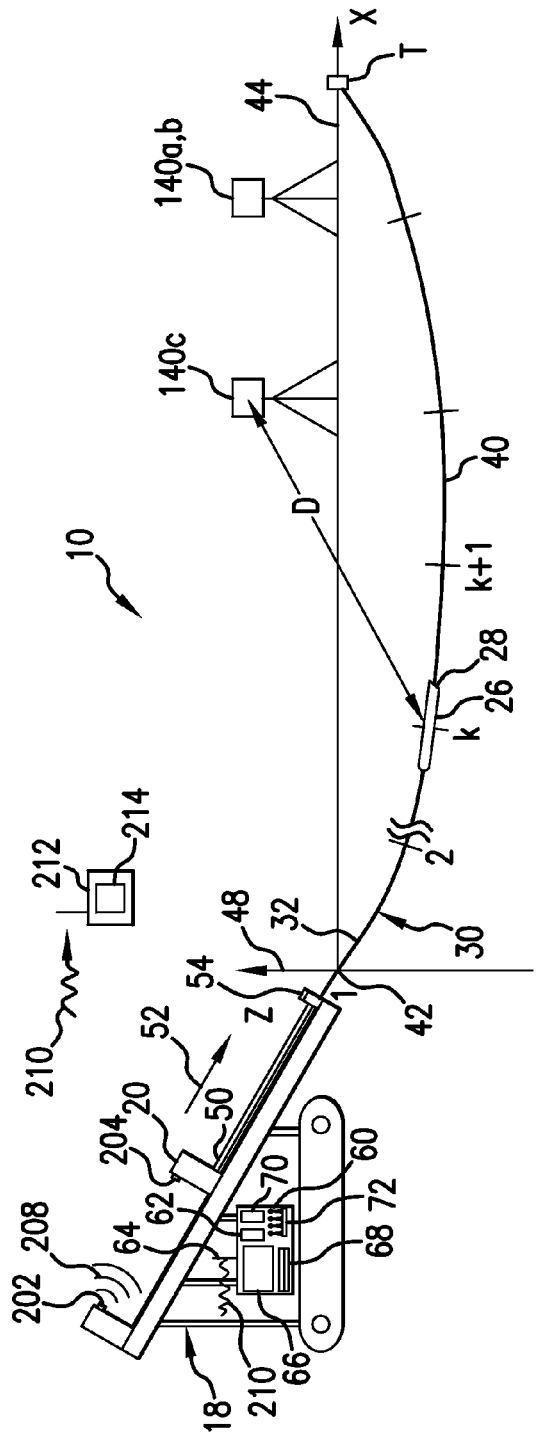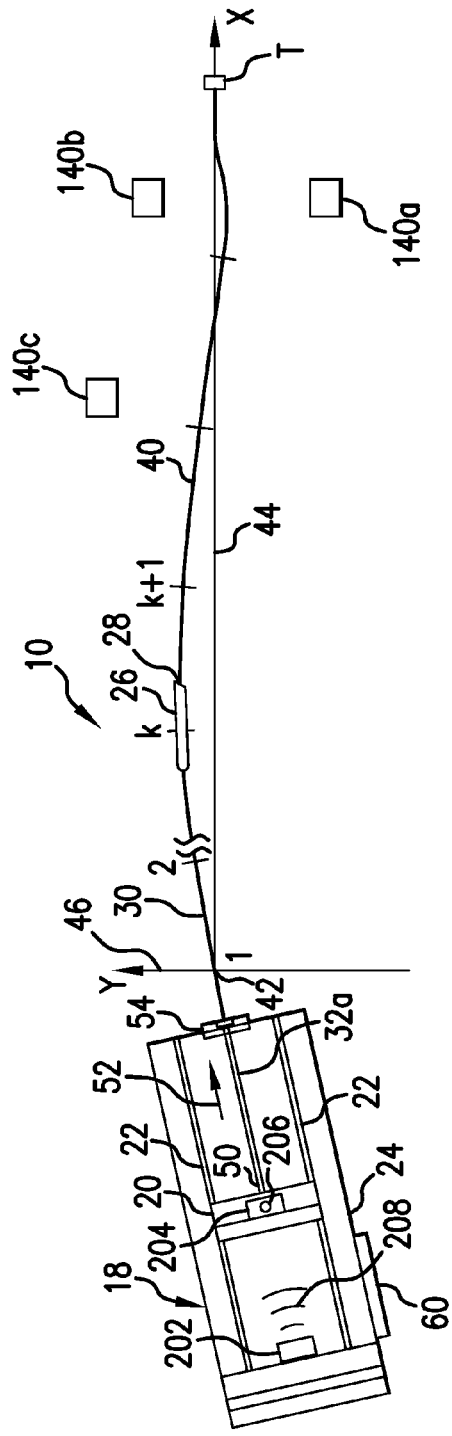

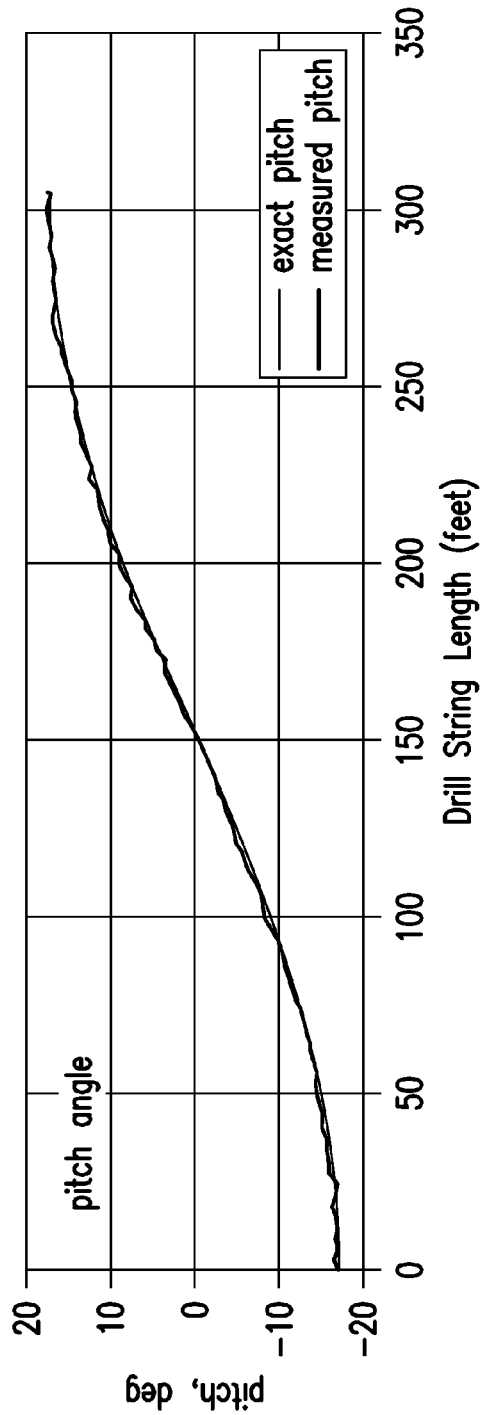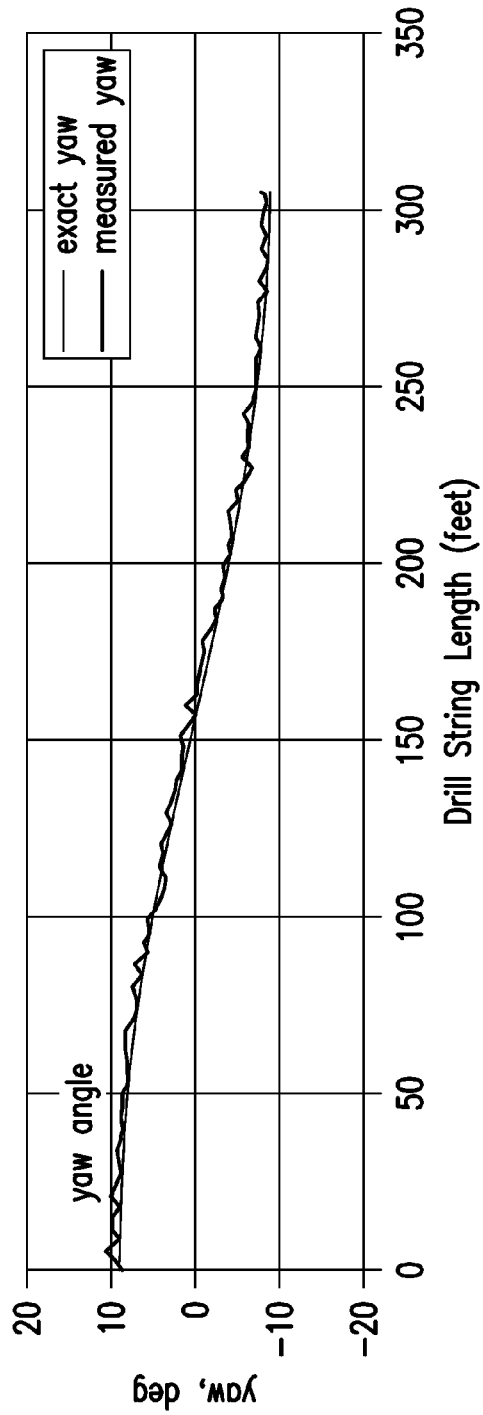

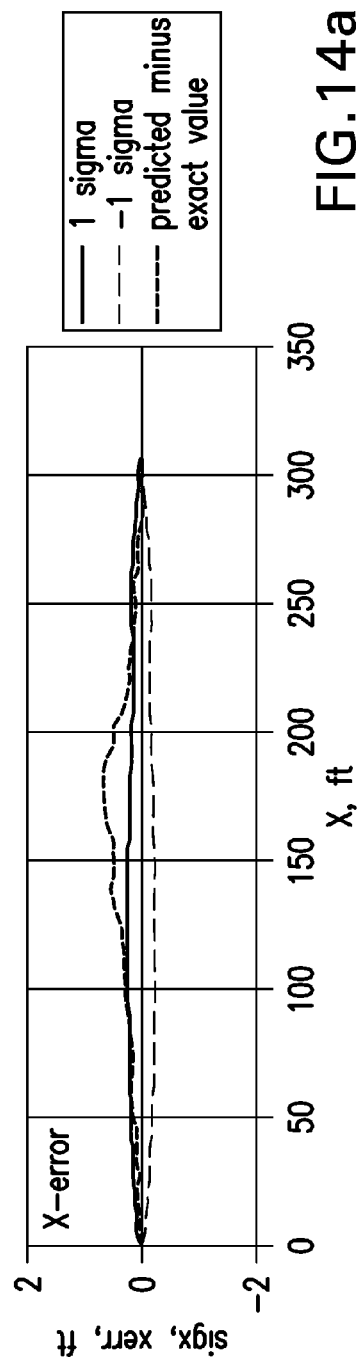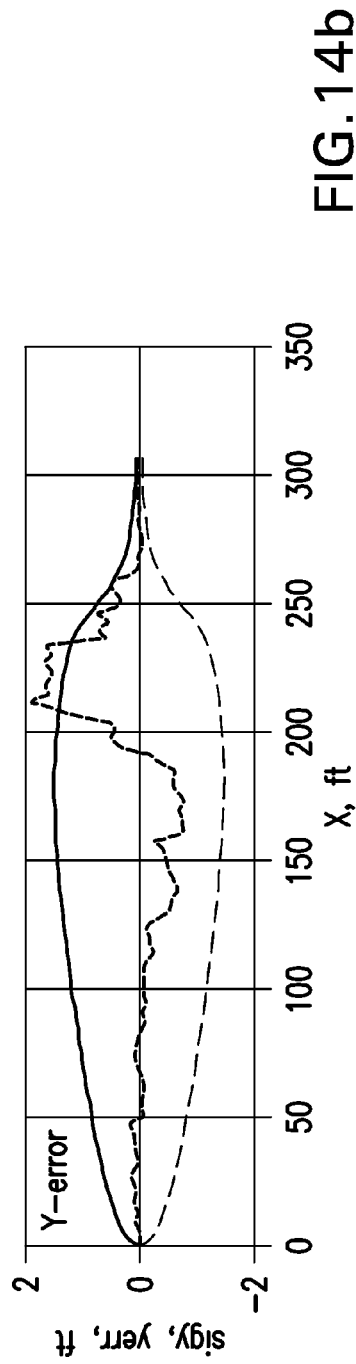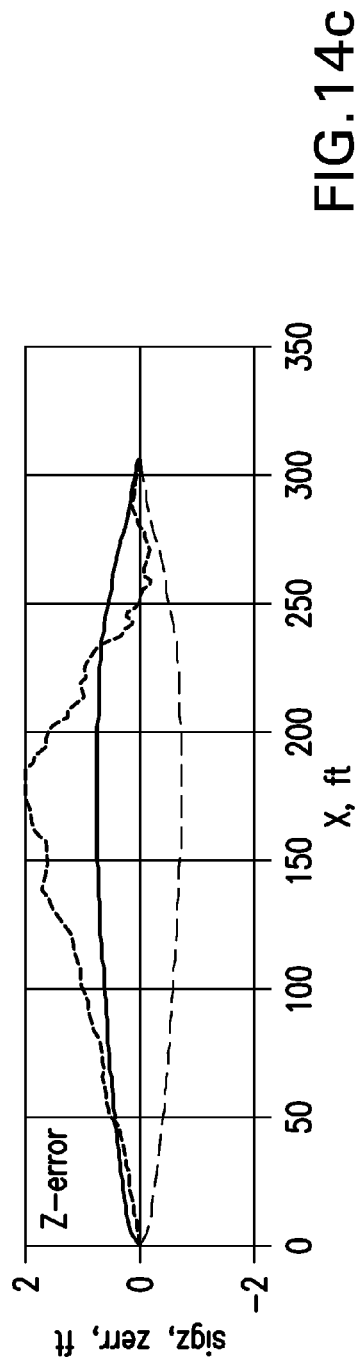

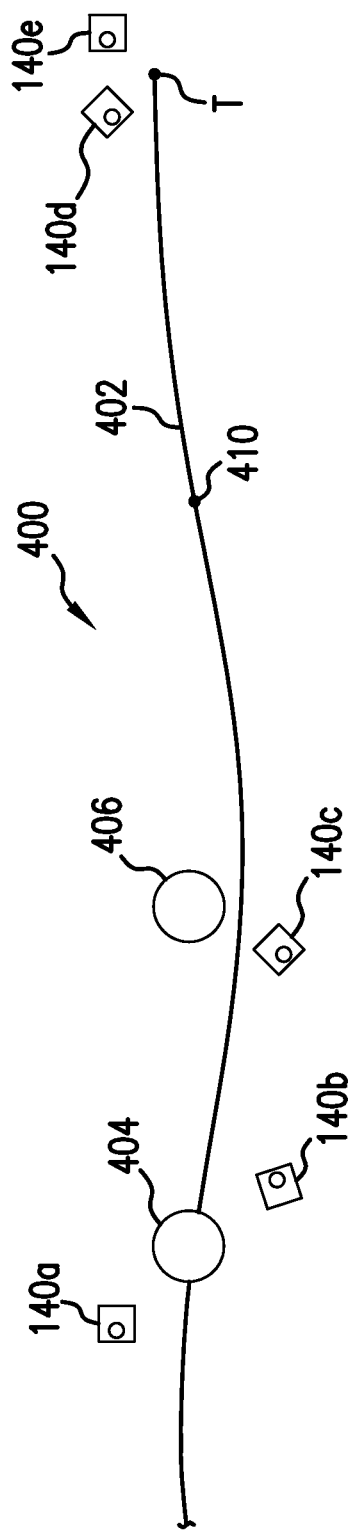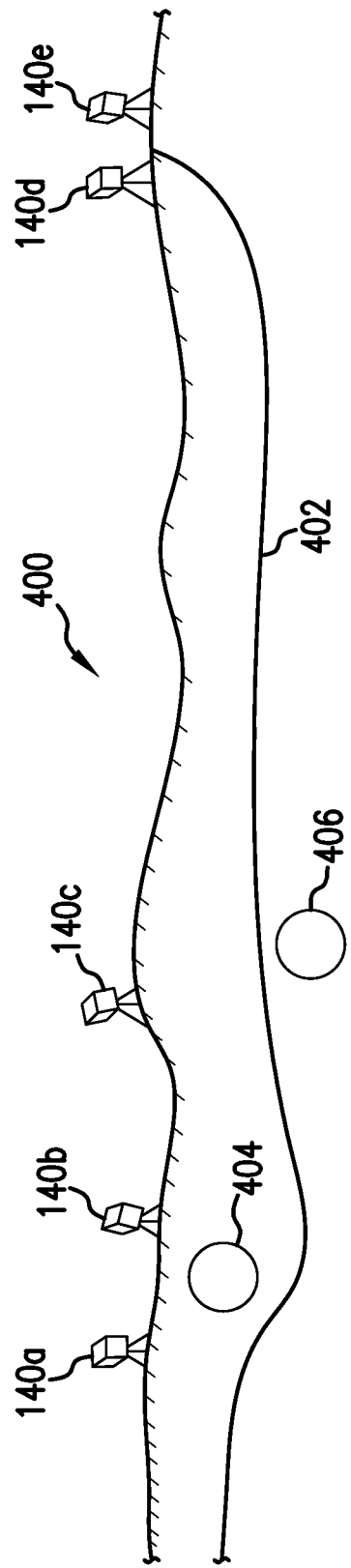

ADVANCED STEERING TOOL SYSTEM, METHOD AND APPARATUS

RELATED APPLICATIONS

This application is a continuation application of U.S. patent application Ser. No. 11/835,154 filed Aug. 7, 2007, U.S. Pat. No. 7,775,301 the disclosure of which is incorporated herein by reference.

BACKGROUND OF THE INVENTION

The present application is generally related to steering tools for horizontal directional drilling and, more particularly, to a system and method using supplemental magnetic information in a steering tool type arrangement.

A boring tool is well-known as a steerable drill head that can carry sensors, transmitters and associated electronics. The boring tool is usually controlled through a drill string that is extendable from a drill rig. The drill string is most often formed of drill pipe sections, which may be referred to hereinafter as drill rods, that are selectively attachable with one another for purposes of advancing and retracting the drill string. Steering is often accomplished using a beveled face on the drill head. Advancing the drill string while rotating should result in the drill head traveling straight forward, whereas advancing the drill string with the bevel oriented at some fixed angle will result in deflecting the drill head in some direction.

One approach that has been taken by the prior art for purposes of monitoring the progress of a boring tool in the field of horizontal directional drilling, resides in what is commonly referred to as a "steering tool". This term has come to describe an overall system which essentially predicts the position of the boring tool, as it is advanced through the ground using a drill string, such that the boring tool can be steered toward a desired target or along a planned drill path within the ground. Steering tool systems are considered as being distinct from other types of locating systems used in horizontal directional drilling at least for the reason that the position of the boring tool is monitored in a step-wise fashion as it progresses through the ground. For this reason, positional error can accumulate with increasing progress through the ground up to unacceptable levels.

Generally, in a steering tool system, pitch and yaw angles of the drill-head are measured in coordination with extension of the drill string. From this, the drill-head position coordinates are obtained by numerical integration. Nominal or measured drill rod lengths can serve as a step size during integration. While this method appears to be sound and might enable an experienced driller to use the steering tool successfully, there are a number of concerns with respect to its operation, as will be discussed immediately hereinafter.

With respect to the aforementioned positional error, it is noted that this error can be attributed, at least in part, to pitch and yaw measurement errors that accumulate during integration. This can often result in large position errors after only a few hundred feet of drilling.

Another concern arises with respect to underground disturbances of the earth's magnetic field, which can cause significant yaw measurement bias errors, potentially leading to very inaccurate position estimates.

Still another concern arises to the extent that steering effectiveness of a typical HDD drill bit depends on many factors including drill bit design, mud flow rate and soil conditions. For example, attempting to steer in wet and sandy soil with the tool in the 12 o'clock roll position might become so ineffective that measured pitch does not provide correct vertical position changes. That is, the orientation of drill head, under such drilling conditions, does not necessarily reflect the direction of its travel.

One approach in dealing with the potential inaccuracy of the steering tool system is to confirm the position of the drill head independently. For example, the drill head can be fitted with a dipole transmitter. A walk over locator can then be used to receive the dipole field and independently locate the drill head. This approach is not always practical, for example, when drilling under a river, lake or freeway. In these situations, the operator might notice position errors too late during drilling and consequently might not have an opportunity to implement a drill-path correction.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a system and associated method are described in which a steering tool is movable by a drill string and steerable in a way that is intended to form an underground bore along an intended path, beginning from a starting position.

In one aspect, a sensing arrangement, forming one part of the steering tool, detects a pitch orientation and a yaw orientation of the steering tool at a series of spaced apart positions of the steering tool along the underground bore, each of which spaced apart positions is characterized by a measured extension of the drill string. At least one marker is positioned proximate to the intended path, for transmitting a rotating dipole field such that at least a portion of the intended path is exposed to the rotating dipole field. A receiver, forming another part of the steering tool, receives the rotating dipole field with the steering tool at a current one of the spaced apart positions to produce magnetic information. A processor is configured for using the detected pitch orientation, the detected yaw orientation and the measured extension of the drill string in conjunction with the magnetic information, corresponding to the current one of the positions of the steering tool, to determine a current location of the steering tool, relative to the starting position, with a given accuracy such that using only the detected pitch orientation, the detected yaw orientation and the measured extension of the drill string to determine the current position, without the magnetic information, would result in a reduced accuracy in the determination of the current location, as compared to the given accuracy.

In another aspect, a sensing arrangement is provided, forming one part of the steering tool, for detecting a pitch orientation and a yaw orientation of the steering tool. The steering tool is moved sequentially through a series of spaced apart positions along the underground bore. Each of the spaced apart positions is characterized by a measured extension of the drill string. At least one marker is arranged, proximate to the intended path, for transmitting a rotating dipole field such that at least a portion of the intended path is exposed to the rotating magnetic dipole. The dipole field is received using a receiver that forms another part of the steering tool, with the steering tool at a current one of the spaced apart positions on the portion of the intended path, to produce magnetic information. A processor is configured for using the detected pitch orientation, the detected yaw orientation and the measured extension of the drill string in conjunction with the magnetic information, corresponding to the current one of the positions of the steering tool, to determine a current location of the steering tool relative to the starting position with a given accuracy such that using only the detected pitch orientation, the detected yaw orientation and the measured extension of the drill string to determine the current location, without the magnetic information, results in a reduced accuracy in the determination of the current location, as compared to the given accuracy.

In still another aspect, a sensing arrangement is provided, forming one part of the steering tool, for detecting a pitch orientation and a yaw orientation of the steering tool. The steering tool is moved sequentially through a series of spaced apart positions to form the underground bore. Each of the spaced apart positions is characterized by a measured extension of the drill string, a detected pitch orientation and a detected yaw orientation. At least one portion of the intended path is identified along which an enhanced accuracy of a determination of the current location of the steering tool is desired. One or more markers is arranged proximate to the portion of the intended path, each of which transmits a rotating dipole field such that at least the portion of the intended path is exposed to one or more rotating dipole fields. A receiver is provided, as part of the steering tool, for generating magnetic information responsive to the rotating dipole fields. A processor is configured for operating in a first mode using the detected pitch orientation, the detected yaw orientation and the measured extension of the drill string to determine a current location of the steering tool corresponding to any given one of the spaced apart positions with at least a given accuracy and for defaulting to a second mode using the detected pitch orientation, the detected yaw orientation, the measured extension of the drill string and the magnetic information, when the magnetic information is received, to determine the current location of the steering tool with an enhanced accuracy that is greater than the given accuracy.

In yet another aspect, a method for establishing a customized accuracy in determination of a position of the steering tool with respect to the intended path is described. A sensing arrangement, forming one part of the steering tool, detects a pitch orientation and a yaw orientation of the steering tool. The steering tool is moved sequentially through a series of spaced apart positions to form the underground bore. Each of the spaced apart positions is characterized by a measured extension of the drill string, a detected pitch orientation and a detected yaw orientation. One or more portions of the intended path are identified along which an enhanced accuracy of the determination of the current location of the steering tool is desired. One or more markers are arranged proximate to each one of the portions of the intended path where each of the markers transmits a rotating dipole field such that each one of the identified portions of the intended path is exposed to one or more rotating dipole fields. As a result of the transmission range of the rotating dipole field, more than just those portions of the intended path may be exposed to the rotating dipole field(s). A receiver is provided, as part of the steering tool, for generating magnetic information responsive to the rotating dipole fields. A processor is configured for operating in a first mode using the detected pitch orientation, the detected yaw orientation and the measured extension of the drill string to determine a current location of the steering tool corresponding to any given one of the spaced apart positions with at least a given accuracy and for operating in a second mode using the detected pitch orientation, the detected yaw orientation, the measured extension of the drill string and the magnetic information to determine the current location of the steering tool with an enhanced accuracy that is greater than the given accuracy, at least for the one or more portions of the intended path, to customize an overall position determination accuracy along the intended path.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 1 is a diagrammatic view, in elevation, of a system according to the present disclosure operating in a region.

FIG. 2 is a diagrammatic plan view of the system of FIG. 1 in the region.

FIGS. 9a and 9b are plots of pitch angle and yaw angle, respectively, versus drill string length for use in a detailed simulation.

FIGS. 14a-c are plots of position error estimates, available through the Kalman filter analysis, versus the X axis and directly compared with position error plots show in FIG. 13c for the drill path of FIGS. 13a and 13b FIG. 15 is a diagrammatic plan view of a drilling region for a concluding portion of an intended drill path, shown here to illustrate various aspects of arranging and moving markers along the drill path.

FIG. 16 is a diagrammatic plan view of the drilling region and drill path of FIG. 16, shown her to illustrate further aspects with respect to arranging and moving markers along the drill path.

DETAILED DESCRIPTION

Figure 3A:
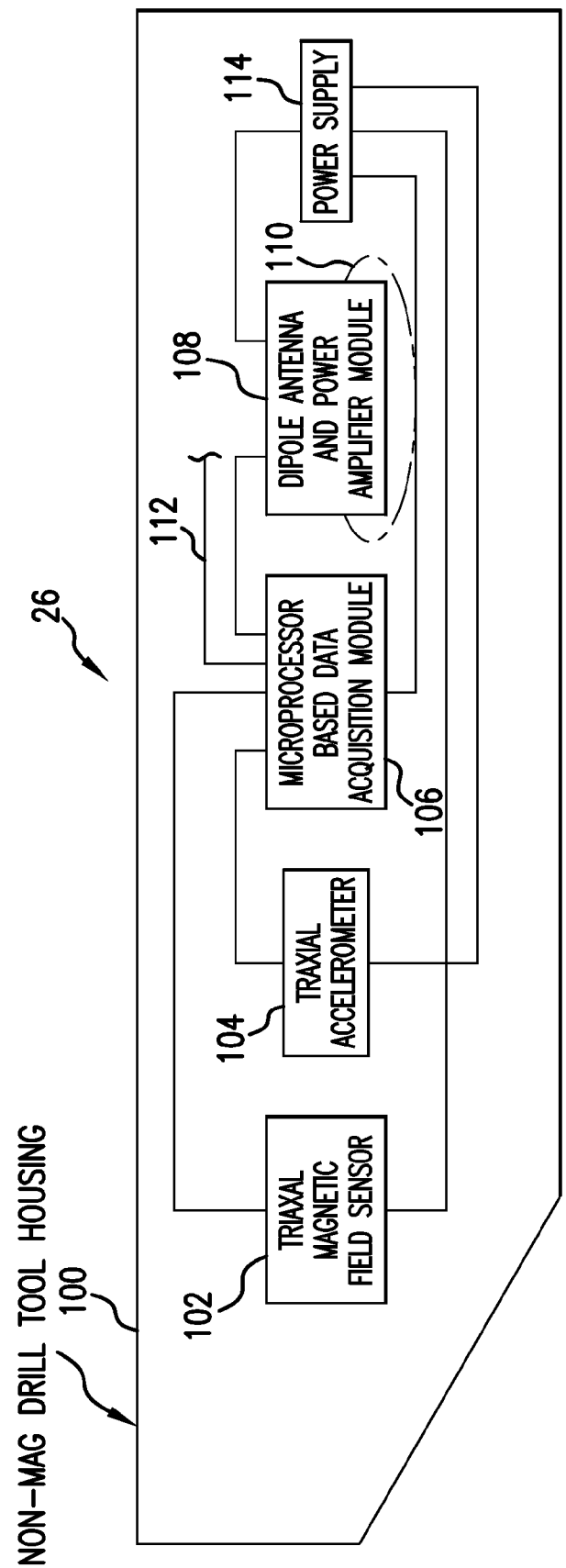
FIG. 3a is a block diagram which illustrates one embodiment of a steering tool that is useful in the system of FIGS. 1 and 2.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein, including modifications and equivalents, as defined within the scope of the appended claims. It is noted that the drawings are not to scale and are diagrammatic in nature in a way that is thought to best illustrate features of interest. Descriptive terminology such as, for example, upper/lower, right/left, front/rear top/bottom, underside and the like has been adopted for purposes of enhancing the reader's understanding, with respect to the various views provided in the figures, and is in no way intended as being limiting.

Turning now to the figures, wherein like components are designated by like reference numbers whenever practical, attention is immediately directed to FIGS. 1 and 2, which illustrate an advanced steering tool system that is generally indicated by the reference number 10 and produced according to the present disclosure. FIG. 1 is a diagrammatic elevation view of the system, whereas FIG. 2 is a diagrammatic plan view of the system. System 10 includes a drill rig 18 having a carriage 20 received for movement along the length of an opposing pair of rails 22 which are, in turn, mounted on a frame 24. A conventional arrangement (not shown) is provided for moving carriage 20 along rails 22. A steering tool 26 includes an asymmetric face 28 and is attached to a drill string 30 which is composed of a plurality of drill pipe sections 32. An intended path 40 of the steering tool includes positions that are designated as k and k+1. The steering tool is advanced from position k to k+1 by either a full or a fraction rod length. If very short drill pipe sections are used, the distance between positions k and k+1 could be greater than a rod length. By way of example, drill pipe sections have a rod length of two feet would be considered as very short. The steering tool is shown as having already passed through points 1 and 2, where point 1 is the location at which the steering tool enters the ground at 42, serving as the origin of the master coordinate system. While a Cartesian coordinate system is used as the basis for the master coordinate systems employed by the various embodiments disclosed herein, it is to be understood that this terminology is used in the specification and claims for descriptive purposes and that any suitable coordinate system may be used.

An x axis 44 extends from entry point 42 to a target location T that is on the intended path of the steering tool, as seen in FIG. 1 and illustrated as a rectangle, while a y axis 46 extends to the left when facing in the forward direction along the x axis, as seen in FIG. 2. A z axis 48 extends upward, as seen in FIG. 1. Further descriptions will be provided at an appropriate point below with respect to establishing this coordinate system.

As the drilling operation proceeds, respective drill pipe sections, which may be referred to interchangeably as drill rods, are added to the drill string at the drill rig. For example, a most recently added drill rod 32a is shown on the drill rig in FIG. 2. An upper end 50 of drill rod 32a is held by a locking arrangement (not shown) which forms part of carriage 20 such that movement of the carriage in the direction indicated by an arrow 52 causes section 32a to move therewith, which pushes the drill string into the ground thereby advancing the boring operation. A clamping arrangement 54 is used to facilitate the addition of drill pipe sections to the drill string. The drilling operation is controlled by an operator (not shown) at a control console 60 which itself can include a telemetry section 62 connected with a telemetry antenna 64, a display screen 66, an input device such as a keyboard 68, a processor 70, and a plurality of control levers 72 which, for example, control movement of carriage 20.

Turning now to FIG. 3a, an electromechanical block diagram is shown, illustrating one embodiment of steering tool 26 that is configured in accordance with the present disclosure. Steering tool 26 includes a slotted non-magnetic drill tool housing 100. A triaxial magnetic field sensing arrangement 102 is positioned in housing 100. For this purpose, a triaxial magnetometer or coil arrangement may be used depending on considerations such as, for example, space and accuracy. A triaxial accelerometer 104 is also located in the housing. Outputs from magnetic field sensing arrangement 102 and accelerometer 104 are provided to a processing section 106 having a microprocessor at least for use in determining a pitch orientation and a yaw heading of the steering tool. A dipole antenna and associated transmitter 108 are optionally located in the steering tool which can be used, responsive to the processing section, for telemetry purposes, for transferring encoded data such as roll, pitch, magnetometer readings and accelerometer readings to above ground locations such as, for example, telemetry receiver 62 (FIG. 1) of console 60 via a dipole electromagnetic field 110 and for locating determinations such as, for example, determining a distance to the steering tool. For such locating determinations, dipole electromagnetic field 110 can be used in conjunction with a walkover locator, although this is not a requirement and is not practical in some cases, as discussed above. Generally, the dipole axis of the dipole antenna is oriented coaxially with an elongation axis of the steering tool in a manner which is well-known in the art. Of course, all of these functions are readily supported by processing section 106, which reads appropriate inputs from the magnetometer and accelerometer, performs any necessary processing and then performs the actual encoding of information that is to be transmitted.

In another embodiment, processing section 106 is configured for communication with processor 70 (FIG. 1) of console 60 using a wire-in-pipe approach wherein a conductor is provided in drill string 30 for transferring information above ground as described, for example, in commonly owned U.S. Pat. No. 6,223,826 entitled AUTO-EXTENDING/RETRACTING ELECTRICALLY ISOLATED CONDUCTORS IN A SEGMENTED DRILL STRING, which is incorporated by reference in its entirety. The conductor in the drill string is in electrical communication with a line 112 that is in electrical communication with processing section 106. It is noted that this approach may also be used to provide power to a power supply 114 from above ground, as an alternative or supplemental to the use of batteries.

Still referring to FIG. 3a, regulated power supply 114, which may be powered using batteries or through the aforedescribed wire-in-pipe arrangement, provides appropriate power to all of the components in the steering tool, as shown. It is noted that magnetic field sensor 102 can be used to measure the field generated by a rotating magnet as well as measuring the Earth's magnetic field. The later may be thought of as a constant, much like a DC component of an electrical signal. In this instance, the Earth's magnetic field may be used advantageously to determine a yaw heading.

Referring again to FIGS. 1 and 2, system 10 is illustrated having three markers 140a-c, each of which includes a rotating magnet for generating a rotating dipole field. Markers 140a and 140b are arranged along a line that is generally orthogonal to the X axis, while marker 140c is offset toward drill rig 18. A rotating dipole field can be generated either by a rotating magnet or by electromagnetic coils. Throughout this disclosure, the discussion may be framed in terms of a rotating magnet, but the described applications of magnets carry over to coils and wire loops with only minor modifications. As will be described in further detail, markers can be placed along the drill-path so that they are at least generally close to the target or other points of interest where high positioning accuracy is required, although one or two markers may provide sufficient accuracy for many drilling applications. That is, the marker signal should be receivable by the steering tool along a portion of the intended path including the target or other point(s) of interest. Aside from this consideration, the position of each marker can be arbitrary. Markers can be placed on the ground, on an elevated structure or even lowered within the ground. In each case, the marker can be at an arbitrary angular orientation. The rotation frequency (revolutions per second) of each magnet can be on the order of 1 Hz, but dipole field frequencies should be distinguishable if more than one marker/magnet is in use. A frequency difference of at least 0.5 Hz is considered to be acceptable for this purpose. Each magnet emits a rotating magnetic dipole field whose total flux is recorded by the steering tool magnetometer and subsequently converted to distance between magnet and tool. During rotation, the magnet of each marker emits a time dependent magnetic dipole field that is measured by the tri-axial magnetometer of the steering tool. As will be seen, a minimum value of the recorded total flux provides a distance between each marker and the steering tool.

Figure 3B:
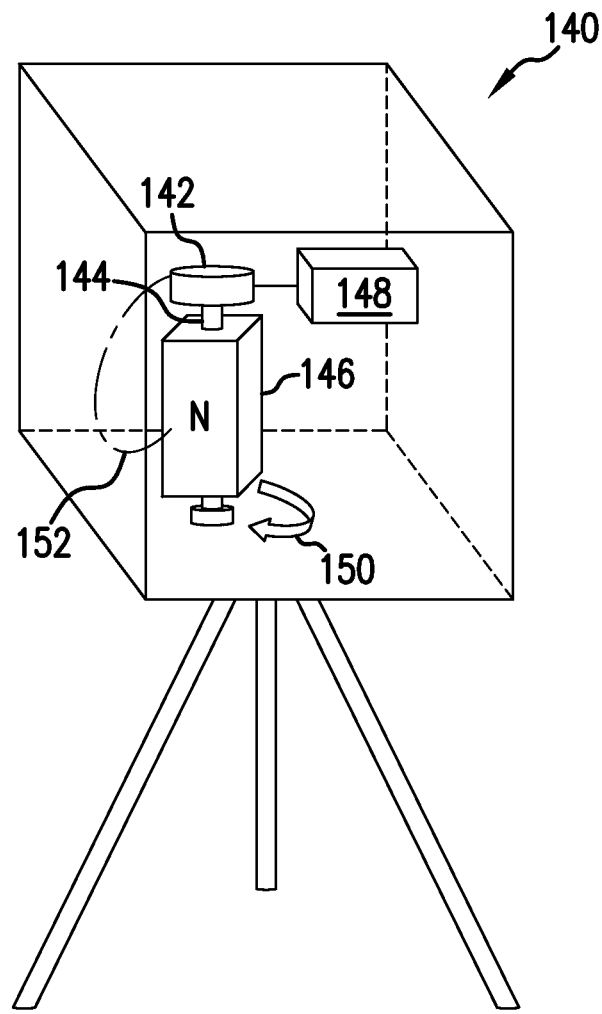
FIG. 3b is a diagrammatic view, in perspective, of a marker that is useful in the system of FIGS. 1 and 2.

Turning now to FIG. 3b, one embodiment of marker 140 is diagrammatically illustrated. It is noted that aforedescribed markers 140a-c may be of this design as well as any additional markers used hereinafter. In this embodiment, each marker 140 can include a drive motor 142 having an output shaft 144 which directly spins a magnet 146 having a north pole, which is visible. Motor 142 is electrically driven by a motor controller 148 to provide stable rotation of the magnet. The motor can rotate the magnet slowly, for example, at about 1 revolution per second (1 Hz), as indicated by arrow 150, thereby emitting a rotating magnetic dipole field 152 (only partially shown). It should be appreciated that a relatively wide range of rotational speeds may employed, for example, from approximately 0.5 Hz to 600 Hz. In one embodiment, a proportional-integral-derivative (PID) controller can be used to drive motor 142 with user selectable rotational velocity. It is noted that such PIDs are commercially available. A benefit associated with using lower rotational velocity resides in a decreased influence by local magnetic objects such as, for example, rebar. If a higher rotational velocity is desired loop antennas can be used to create the rotational field. Further, the rotational velocity can be varied so that the fields from various markers are distinguishable when simultaneously rotating. A suitable power supply can be used, as will be recognized by one having ordinary skill in the art, such as for example a battery and voltage regulator, which have not been shown. It should be appreciated that there is no need for an encoder, since the specific angle of the magnet, corresponding to a particular measurement position, is not involved in making the determinations that are described below. Further, orientation sensors and a telemetry section in marker 140 are not needed. As will be seen, variation in rotation rate of magnet 146 will introduce associated positional error. Hence, a desire to increase measurement accuracy is associated with increasing the rotational stability of magnet 146.

Still referring to FIG. 3b, while the axis of rotation of magnet 146 is illustrated as being vertical, this is not a requirement. The axis of rotation can be horizontal or at some arbitrary tilted orientation. Moreover, positioning of the marker for field use does not require orienting the marker in any particular way. This remarkable degree of flexibility and ease of positioning these markers is one of the benefits of the system and method taught herein.

Most conventional applications of the steering tool function rely on a nominal value for drill rod length when integrating pitch and yaw to determine position. In accordance with the present disclosure, however, pitch and yaw can be measured more than once along each drill rod such that the distance between successive steering tool measurement positions can be less than the nominal length of one drill rod. This is particularly the case when the length of the drill rod is exceptionally long such as, for example, thirty feet. For this purpose, a laser distance meter, a potentiometer, an ultrasonic arrangement or some other standard distance measurement device can be mounted on the drill rig. An ultrasonic arrangement will be described immediately hereinafter.

Referring again to FIGS. 1 and 2, a drill string measuring arrangement includes a stationary ultrasonic transmitter 202 positioned on drill frame 18 and an ultrasonic receiver 204 with an air temperature sensor 206 (FIG. 2) positioned on carriage 20. It should be noted that the positions of the ultrasonic transmitter and receiver may be interchanged with no effect on measurement capabilities. Transmitter 202 and receiver 204 are each coupled to processor 70 or a separate dedicated processor (not shown). In a manner well known in the art, transmitter 202 emits an ultrasonic wave 208 that is picked up at receiver 204 such that the distance between the receiver and the transmitter may be determined to within a fraction of an inch by processor 70 using time delay and temperature measurements. By monitoring movements of carriage 20, in which drill string 30 is either pushed into or pulled out of the ground, and clamping arrangement 54, processor 70 can accurately track the length of drill string 30 throughout a drilling operation. While it is convenient to perform measurements in the context of the length of the drill rods, with measurement positions corresponding to the ends of the drill rods, it should be appreciated that this is not a requirement and the ultrasonic arrangement can provide the total length of the drill string at any given moment in time. Further, the length according to the number of drill rods multiplied by nominal rod length can be correlated to the length that is determined by ultrasonic measurement.

Referring to FIG. 1, control console 60, in this embodiment, serves as a base station to communicate with steering tool 26, to monitor its power supply, to receive and process steering tool data and to send commands to the steering tool, if so desired. Determined drill-path positions and estimated position errors can be displayed on display screen 66 for monitoring by the system operator. This functionality may also be extended to a remote base station configuration, for example, by using telemetry section 64 to transmit information 210 to a remote base station 212 for display on a screen 214.

Measured Quantities

The steering method requires measurement of the following variables:

Tool pitch and yaw angles $\phi$, $\beta$

Distances $D_i$ between $N_M$ magnets and the steering tool ($i=1, \ldots N_M$)

Magnet positions $(X_{M_i}, Y_{M_i}, Z_{M_i})$, ($i=1, \ldots N_M$)

Initial tool position $(X_1, Y_1, Z_1)$

Rod length increments $\Delta s_{k+1}$ ($k=1, 2, 3, \ldots$)

Referring to FIGS. 1 and 2, pitch and yaw are measured and magnet-to-tool distances are determined at a series of tool positions including the initial tool position. Point 1, which is additionally denoted by the reference number 42, designates the position of drill begin. The steering tool is currently located at a measurement position k and is intended to proceed to position k+1. These positions can correspond to the end points of a drill rod or to intermediate points along the length of each drill rod. As discussed above, intermediate points may be needed, for example, when an exceptionally long drill rod is used such as, for example, 30 feet. Higher accuracy will generally be provided through the use of relatively more measurement positions. In some cases, the drill rod length may be sufficiently short that the number of drill rods may provide a sufficiently accurate value as to the length of the drill string. The latter situation may also be characterized by drill rods having a tolerance in their average length that is reasonably close to a nominal value. In some embodiments, there may be no correspondence between the drill rod length and the measurement positions, for example, where a measurement system, such as is employed by system 10, is capable of measuring and monitoring an overall length of the drill string. For purposes of simplicity of description, it will be assumed that the drill rod length is used in the remainder of this description to establish the measurement positions. It is noted that measurements at each measurement position may be performed on-the-fly while pushing and/or rotating the drill string; however, enhanced accuracy can be achieved by stopping movement of the steering tool at each of the measurement positions during the measurements. A rod length increment $\Delta s_{k+1}$ is defined as the arc-length between tool measurement positions $(X_k, Y_k, Z_k)$ and $(X_{k+1}, Y_{k+1}, Z_{k+1})$. The setup of this coordinate system is described immediately hereinafter.

Set-Up of Steering System

Figure 3C:
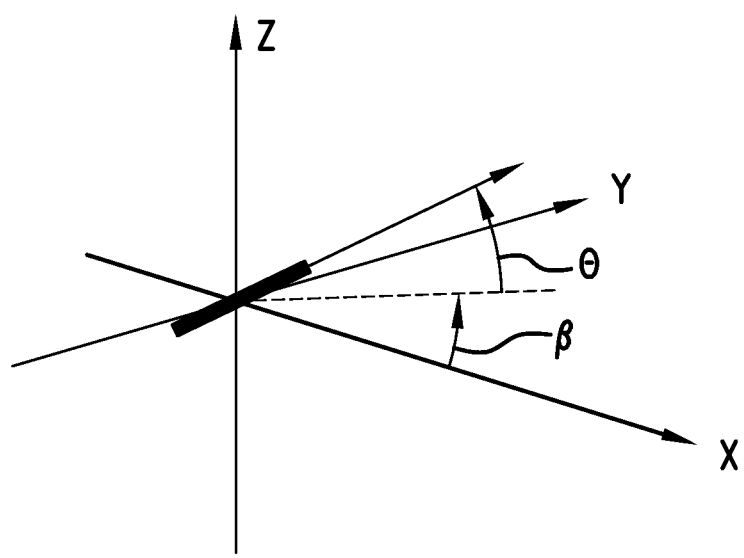
FIG. 3c shows a coordinate system in which pitch and yaw are illustrated.

Referring to FIG. 3c, in conjunction with FIGS. 1 and 2, the origin and directions of the X,Y,Z-coordinate system can be specified in relation to drill begin point 1 and target T. The location where drilling begins is a convenient choice for the origin and the direction from this position to the projection of the target onto a level plane through the origin defines the X-coordinate axis. The Z-coordinate axis is positive upward and the Y-coordinate axis completes a right-handed system. If desired, a different right-handed Cartesian coordinate system or any suitable coordinate system may be used. In the present example, the formulation constrains the X-axis to be level. As noted above, yaw orientation is designated as $\beta$ measured from the X axis in a level X,Y plane, whereas pitch orientation is designated as $\phi$ measured vertically from the yawed tool position in the X,Y plane as represented by a dashed line in the X,Y plane. FIG. 3c defines pitch and yaw as Euler angles that require a particular sequence of yaw and pitch rotations in order to rotate the steering tool from a hypothetical position along the X axis into its illustrated position.

Magnet Position Measurements

The use of an Electronic Distance Measurement device (EDM) is currently the quickest and most accurate method of defining the X-coordinate axis and measuring magnet position coordinates. However, using an EDM for this purpose requires the presence of a surveyor at the HDD job site, which may sometimes be difficult to arrange. Accordingly, any suitable method may be used.

As an alternative to an EDM, a laser distance measurement device can be used. Devices of this kind are commercially available with a maximum range of about 650 feet and a distance measurement accuracy of ⅛ of an inch; the Leica Disto™ laser distance meter is an example of such a device. The device is placed at the position of drill-begin and pointed at the target to obtain the distance between these two positions. For short range measurements, the device can be hand-held, but for larger distances it should be fixedly mounted to focus reliably. When an EDM, laser distance measurement device or similar device is used to determine the magnet positions, the accuracy of the device itself can be used as the magnet position error in the context of the discussions below.

Figure 4:
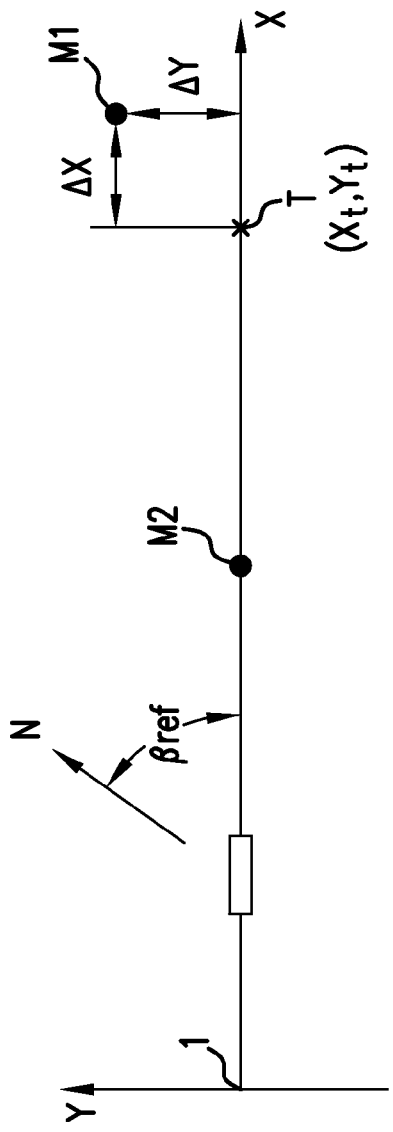
FIGS. 4 and 5 illustrate one embodiment of a setup technique that can be used in conjunction with the system of FIGS. 1 and 2.
Figure 5:
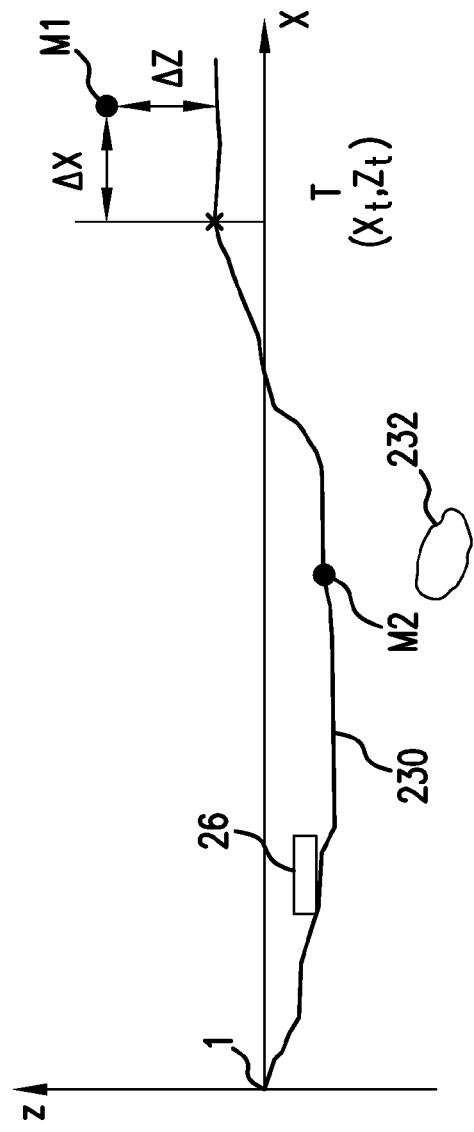

Referring to FIGS. 4 and 5, one embodiment of a setup technique is illustrated. FIG. 4 illustrates a diagrammatic plan view of steering tool 26 positioned ahead of drill begin point 1 with target T arranged along the X axis and a marker M1 that is offset from the X axis. The target is located at coordinates $X_t, Y_t, Z_t$. FIG. 5 illustrates a diagrammatic elevational view of steering tool 26 positioned ahead of drill begin point 1 on a surface 230 of the ground. In one embodiment, a laser distance meter (LDM) can be used having a tilt sensor so that horizontal and vertical distances $X_t, Z_t$ to the target can either be calculated or are directly provided by the LDM. The relative position $(\Delta X, \Delta Y, \Delta Z)$ between the target and a marker, M1, located near the target can also be measured using the LDM, with a measuring tape or in any other suitable manner. Marker position coordinates can be obtained by adding position increments to target coordinates, as follows:

$$X_{M1} = X_t + \Delta X \tag{1}$$

$$Y_{M1} = \Delta Y \tag{2}$$

$$Z_{M1} = Z_t + \Delta Z \tag{3}$$

The foregoing procedure can be repeated for any number of markers that are arranged proximate to the target.

In another embodiment, the position of each marker can be measured directly, for example using an EDM, with no need to measure the location of the target, so long as some other position has been provided that establishes the X axis from point 1 of drill begin. For example, a marker M2 may be arranged along the X axis. As will be further described, location accuracy along the X axis can be customized based on the arrangement of markers therealong. The need for enhanced accuracy for some portion of the path of the steering tool can be established, for example, based on the presence of a known inground obstacle 232.

Reference Yaw Angle

Continuing to refer to FIGS. 4 and 5, a reference yaw angle $\beta_{ref}$ is defined as the yaw angle of the steering tool, measured by the steering tool, with its elongation axis aligned with the X-direction. In the present example, the reference yaw angle is measured as a compass orientation from magnetic north, based on the Earth's magnetic field. Since steering tool yaw has previously been defined as positive for a counterclockwise rotation the particular reference yaw angle $\beta_{ref}$ shown in FIG. 4 is negative. Accordingly, in order to measure yaw accurately without interference from the magnetic influence of the drill rig, the steering tool can be placed on a level ground a sufficient distance ahead of the drill; 30 feet is usually adequate. The elongation axis of the steering tool is at least approximately on or at least parallel to the X-axis. Yaw angle $\beta_m$, measured as a compass heading during steering, is subsequently replaced by $\beta = \beta_m - \beta_{ref}$.

Steering Procedure Formulation

Nomenclature $c_A$=pitch and yaw error covariance matrix
$c_e$=empirical coefficient
$c_M$=magnet position error covariance matrix
D=distance between marker and steering tool
F=continuous state equations matrix
H=observation coefficient vector
$N_M$=number of markers
P=error covariance matrix
Q=continuous process noise covariance parameter matrix
$Q_k$=discrete process noise covariance matrix
R=observation covariance scalar
$\vec{r}$=vector of magnet position measurement error
s=arc-length along drill-rod axis
$v_D$=distance measurement noise
$v_M$=magnet position measurement noise
$\vec{x}$=state variables vector
X,Y,Z=global coordinates
$X_k,Y_k,Z_k$=steering tool position coordinates
z=measurement scalar
$\beta$=yaw angle
$\delta X, \delta Y, \delta Z$=position state variables
$\delta X_M, \delta Y_M, \delta Z_M$=magnet position increments
$\delta \beta, \delta \phi$=yaw and pitch angle increments
$\Delta s$=rod length increment
$\phi$=pitch angle
$\Phi_k$=discrete state equation transition matrix
$\sigma$=standard deviation
$\sigma^2$=variance, square of standard deviation Subscripts bias=bias error
D=distance
ex=exact value
i=i-th magnet
k=k-th position on drill path
M=magnet
m=measured
ref=reference
1=initial tool position (drill begin at k=1)

Superscripts $() = \dfrac{d}{ds}$ $()^-$ = indicates last available estimate
$()'$ = transpose $()^*$ = nominal drill path $\hat{\vec{x}}$ = state variables vector estimate Tracking Equations The method is based on two types of equations, referred to as steering tool process equations and distance measurement equations. The former are a set of ordinary differential equations describing how tool position (X,Y,Z) changes along the drill-path as a function of measured pitch $\phi$ and yaw $\beta$ and shown as equations 4.

$$\begin{Bmatrix} \dot{X} \\ \dot{Y} \\ \dot{Z} \end{Bmatrix} = \begin{Bmatrix} \cos\phi\cos\beta \\ \cos\phi\sin\beta \\ \sin\phi \end{Bmatrix} \tag{4}$$

The over-dot indicates that derivatives of position coordinates are to be taken with respect to arc-length s along the axis of the drill rod. Pitch and yaw angles are illustrated in FIG. 3c. Accordingly, the premise of a conventional steering tool resides in a numerical integration of equations 4 with respect to arc length s of the drill string. Unfortunately, as discussed above, this technique readily produces potentially serious positional errors in and by itself.

The aforementioned distance measurement equations are of the form:

$$D^2 = (X_M - X)^2 + (Y_M - Y)^2 + (Z_M - Z)^2 \tag{5}$$

The distance measurement equations express distance D between the center of a rotating magnet of a marker and the center of tri-axial steering tool magnetometer 102 (see FIG. 1) in terms of tool position (X,Y,Z) and magnet position ($X_M, Y_M, Z_M$). Accordingly, $N_M$ of such equations can be written for a system, corresponding to the total number of markers.

The origin of the global X,Y,Z-coordinate system in which tool position will be tracked can be chosen to coincide with the location of drill begin (point 1 in FIGS. 1 and 2).

$$X_1 = 0 \quad Y_1 = 0 \quad Z_1 = 0 \tag{6}$$

Equations (4), (5) and (6) represent an initial value problem that can be solved for steering tool position coordinates.

Nonlinear Solution Procedures

The foregoing initial value problem can be solved using either a nonlinear solution procedure, such as the method of nonlinear least squares, the SIMPLEX method, or can be based on Kalman filtering. The latter will be discussed in detail beginning at an appropriate point below. Initially, however, an application of the SIMPLEX method will be described where the description is limited to the derivation of the nonlinear algebraic equations that are to be solved at each drill-path position. Details of the solver itself are well-known and considered as within the skill of one having ordinary skill in the art in view of this overall disclosure.

The present technique and other solution methods can replace the derivatives $\dot{X}, \dot{Y}, \dot{Z}$ in equations (4) with finite differences that are here written as:

$$\dot{X} = \frac{X_{k+1} - X_k}{\Delta s_{k+1}} \quad (7)$$

$$\dot{Y} = \frac{Y_{k+1} - Y_k}{\Delta s_{k+1}} \quad (8)$$

$$\dot{Z} = \frac{Z_{k+1} - Z_k}{\Delta s_{k+1}} \quad (9)$$

Resulting algebraic equations read:

$$f_1 = X_{k+1} - X_k - \Delta s_{k+1} \cos\phi_k \cos\beta_k = 0 \quad (10)$$

$$f_2 = Y_{k+1} - Y_k - \Delta s_{k+1} \cos\phi_k \sin\beta_k = 0 \quad (11)$$

$$f_3 = Z_{k+1} - Z_k - \Delta s_{k+1} \sin\phi_k = 0 \quad (12)$$

The distance measurement equations (5) provide additional $N_M$ equations written as:

$$f_{4_i} = D_{k+1,i}^2 - (X_{k+1} - X_{M_i})^2 - (Y_{k+1} - Y_{M_i})^2 - (Z_{k+1} - Z_{M_i})^2 = 0 \quad (13)$$

Starting with the known initial values (Equations 6) at drill begin, the coordinates of subsequent positions along the drill path can be obtained by solving the above set of nonlinear algebraic equations (10-13) for each new tool position. The coordinates of position k+1 are calculated iteratively beginning with some assumed initial solution estimate that is sufficiently close to the actual location to assure convergence to the correct position. One suitable estimate will be described immediately hereinafter.

Figure 6:
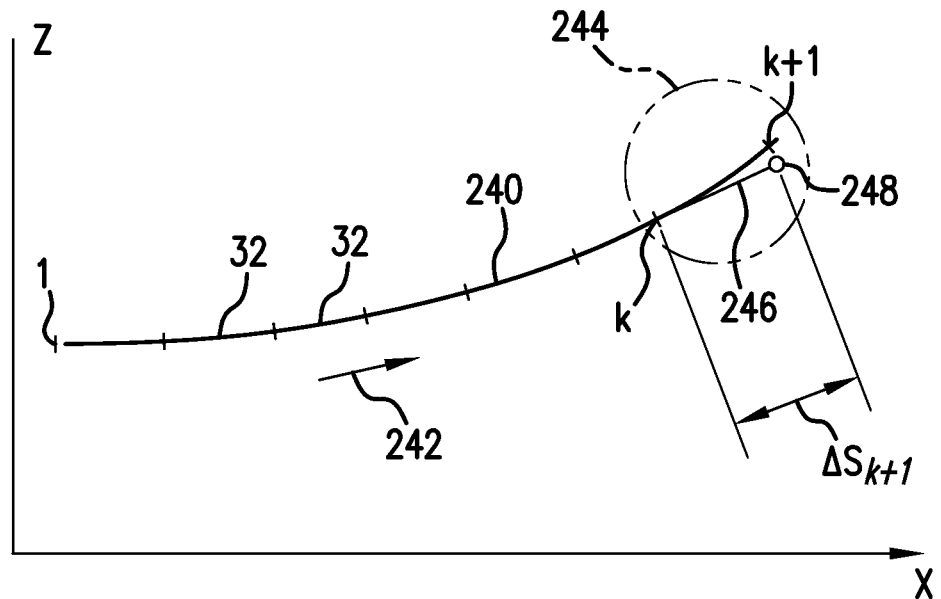
FIG. 6 is a diagrammatic view, in elevation, of a drill path along which the steering tool is disposed, shown here to illustrate one embodiment of a technique for providing an initial solution estimate for the position of the steering tool.
Figure 7A:
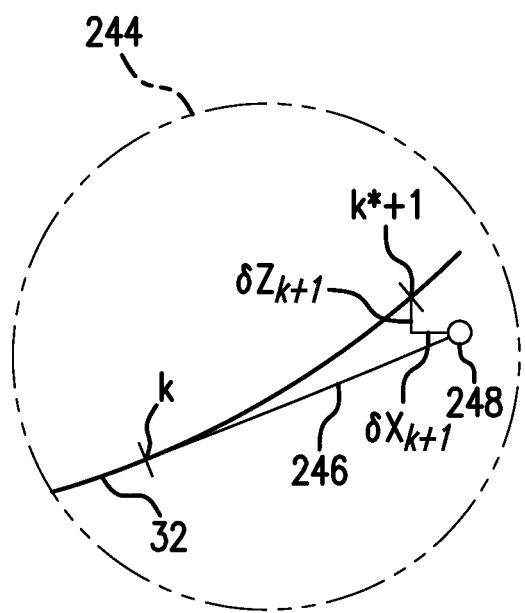
FIG. 7a is a diagrammatic, further enlarged view, of a portion of FIG. 6, shown here to illustrate further details of the initial solution estimate technique.

Referring to FIGS. 6 and 7a, the X,Z plane is illustrated with a drill path 240 formed therein and in a direction 242 using a plurality of drill rods 32, at least some of which have been designated by reference numbers. FIG. 7a is an enlarged view within a dashed circle 244 of FIG. 6. An initial solution estimate is given by a point on what may be referred to as a nominal drill-path 246 that can be found by linear extrapolation of the previously predicted/last determined position to a predicted position 248. The linear extrapolation is based on equations 4 and a given incremental movement $\Delta s_{k+1}$ of the steering tool from a $k^{th}$ position where:

$$\begin{Bmatrix} X_{k+1}^* \\ Y_{k+1}^* \\ Z_{k+1}^* \end{Bmatrix} = \begin{Bmatrix} X_k \\ Y_k \\ Z_k \end{Bmatrix} + \Delta s_{k+1} \begin{Bmatrix} \cos\phi_k \cos\beta_k \\ \cos\phi_k \sin\beta_k \\ \sin\phi_k \end{Bmatrix} \quad (14)$$

Where predicted positions are indicated in equations 14 using an asterisk( )*. It should be appreciated that the position of the steering tool is characterized as predicted or estimated since the location is not identified in an affirmative manner such as is the case, for example, when a walk-over locater is used. The use of a steering tool differs at least for the reason that the position of the steering tool is estimated or predicted based on its previous positions. Thus, the actual position of the steering tool, for a sufficiently long drill path, can be significantly different than the position that is determined by a steering tool technique, as a result of accumulating error, if this error is not managed appropriately.

Application of the SIMPLEX method requires definition of a function that is to be minimized during the solution procedure. An example of such a function that is suitable in the present application reads:

$$F = \sum_{p=1}^{3+N_M} f_p^2 \quad (15)$$

As noted above, it is considered that one having ordinary skill can conclude the solution procedure under SIMPLEX in view of the foregoing.

Kalman Filter Solution

In another embodiment, a method is described for solving the tracking equations employing Kalman filtering. The filter minimizes the position error caused by measurement uncertainties in a least square sense. The filter determines position coordinates as well as position error estimates.

The three tool position coordinates (X,Y,Z) are chosen as the main system parameters. Increments ($\delta X, \delta Y, \delta Z$) of these parameters are referred to as state variables. The solution method can be characterized as a predictor-corrector technique. Assuming all drill-path variables are known at a last determined position and a drill string increment is known, the current or next-determined position on the drill path can be approximated by linear extrapolation, as described above with respect to FIGS. 6 and 7a. This is the predictor step that gives a point on nominal drill path 246. The Kalman filter, in turn, performs a corrector step in which state variables are calculated and added to the nominal drill path.

Initial tool position coordinates $(X_1, Y_1, Z_1)$ are assumed and corresponding error variances $(\sigma_{X_1}^2, \sigma_{Y_1}^2, \sigma_{Z_1}^2)$ are known. For example, at $(X_1, Y_1, Z_1)$, which is the origin of the coordinate system, the error variances are zero. If $(X_1, Y_1, Z_1)$ is not the origin, the error variances are based on the accuracy of measurement from the origin. The tracking procedure starts from this initial position and proceeds along the drill path, as follows:

As is illustrated in FIGS. 6 and 7a, the last known drill path position $(X_k, Y_k, Z_k)$ is extrapolated linearly to obtain an approximate or estimated tool position, previously introduced as nominal drill path position $(X_{k+1}^*, Y_{k+1}^*, Z_{k+1}^*)$.

The filter determines state variables $(\delta X_{k+1}, \delta Y_{k+1}, \delta Z_{k+1})$ and standard deviations of position error $(\sigma_{X_{k+1}}, \sigma_{Y_{k+1}}, \sigma_{Z_{k+1}})$.

State variables are added to the nominal drill path position to find the new tool position $(X_{k+1}, Y_{k+1}, Z_{k+1})$.

$$\begin{Bmatrix} X_{k+1} \\ Y_{k+1} \\ Z_{k+1} \end{Bmatrix} = \begin{Bmatrix} X_{k+1}^* \\ Y_{k+1}^* \\ Z_{k+1}^* \end{Bmatrix} + \begin{Bmatrix} \delta X_{k+1} \\ \delta Y_{k+1} \\ \delta Z_{k+1} \end{Bmatrix} \quad (16)$$

Measurement Errors

The Kalman filter takes the following random measurement errors into account which must therefore be known before tracking begins.

Tool pitch and yaw angle errors $\sigma_\phi, \sigma_\beta$

Distance error $\sigma_D$

Magnet position errors $(\sigma_{X_M}, \sigma_{Y_M}, \sigma_{Z_M})$

Initial tool position errors $(\sigma_{X_1}, \sigma_{Y_1}, \sigma_{Z_1})$

Error values are empirical and depend on the type of instrumentation used. Note that the effect of drill rod length measuring error is not part of the analysis since arc-length along the axis of the drill rod is used as an independent variable.

Knowing initial tool position errors $(\sigma_{X_1}, \sigma_{Y_1}, \sigma_{Z_1})$, the corresponding error covariance matrix $P_1$ is given as:

$$P_1 = \begin{bmatrix} \sigma_{X_1}^2 & 0 & 0 \\ 0 & \sigma_{Y_1}^2 & 0 \\ 0 & 0 & \sigma_{Z_1}^2 \end{bmatrix} \quad (17)$$

Adding the latter to equations (4) to (6) completes the formulation of the initial value problem to be solved by Kalman filtering.

Linearized Tracking Equations

In addition to various measured quantities that are summarized above, the Kalman filter solution uses input of the following parameters.

$\Phi_k$ discrete state equation transition matrix
$Q_k$ discrete process noise covariance matrix
z measurement scalar
H observation coefficient vector
R observation error covariance scalar The above parameters are derived by linearizing the steering tool process equations and distance measurement equations about the nominal drill path position. The resulting two sets of linear equations are the so-called state equations and the observation equations. They are summarized below.

The state variables are defined as position increments.

$$\vec{x} = (\delta X, \delta Y, \delta X)' \quad (18a)$$

$$\dot{\vec{x}} = (\delta \dot{X}, \delta \dot{Y}, \delta \dot{Z})' \quad (18b)$$

The state equations governing state variables read $$\vec{x}_{k+1} = \Phi_k \vec{x}_k + \Delta s_{k+1} G_k \vec{u}_k \quad (19)$$

Where $\Delta s_{k+1} G_k \vec{u}_k$ represents pitch and yaw measurement noise. It is noted that, hereinafter, subscripts may be dropped for purposes of clarity. Accordingly:

$$\Phi = I \quad (20)$$

$$Q = \cos((\Delta s) G \vec{u}) \quad (21)$$

and $$\vec{u} = (\delta \phi, \delta \beta)' \quad (22)$$

$$G = \begin{bmatrix} -\sin\phi\cos\beta & -\cos\phi\sin\beta \\ -\sin\phi\sin\beta & \cos\phi\cos\beta \\ \cos\phi & 0 \end{bmatrix} \quad (23)$$

The discrete noise covariance matrix $Q_k$ becomes:

$$c_A = \begin{bmatrix} \sigma_\phi^2 & 0 \\ 0 & \sigma_\beta^2 \end{bmatrix} \quad (24)$$

$$Q = c_e(\Delta s)^2 G c_A G' \quad (25)$$

Note that the empirical coefficient $c_e$ has been added to equation (25) in order to account for pitch and yaw bias errors. It has unit value if pitch and yaw measurement errors are entirely random.

The observation equation of a rotating magnet reads:

$$z = H\vec{x} + v_D + v_M \quad (27)$$

$$R = cov(v_D + v_M) \quad (28)$$

Where the term $v_D$ represents distance measurement noise and the term $v_M$ represents magnet position measurement noise. The term H will be described at an appropriate point below. The symbol z, seen in equation (27) is a difference between measured distance D and calculated distance D* from a marker to the nominal drill path position, given as:

$$z = D - D^* \quad (29)$$

$$D^{*2} = (X^* - X_M)^2 + (Y^* - Y_M)^2 + (Z^* - Z_M)^2 \quad (30)$$

The first term H on the right hand side of equation (27) is the observation coefficient vector, written as:

$$H = \left( \frac{X^* - X_M}{D^*}, \frac{Y^* - Y_M}{D^*}, \frac{Z^* - Z_M}{D^*} \right) \quad (31)$$

The following form of the observation covariance scalar R is used in the steering tool method:

$$R = \sigma_D^2 + H c_M H' \quad (32)$$

$$c_M = \begin{bmatrix} \sigma_{X_M}^2 & 0 & 0 \\ 0 & \sigma_{Y_M}^2 & 0 \\ 0 & 0 & \sigma_{Z_M}^2 \end{bmatrix} \quad (33)$$

Projection of State Variables and Estimation Errors

An estimate of the state vector at the next steering tool position k+1 is denoted by $\hat{\vec{x}}$ and its error covariance matrix is $P^-$ where the superscript ( )⁻ indicates the last available estimate. Before the filter is applied at the new tool position, set $$\hat{\vec{x}} = \{0\} \quad (34)$$

The error covariance matrix $P_k$ is projected to the new position using $$P_{k+1}^- = \Phi_k P_k \Phi'_k + Q_k \quad (35)$$

Kalman Filter Loop

The filter loop is executed once for each marker, resulting in a flexible arrangement that is able to process any number of markers in use by the steering tool system.

The classical, well documented version of the filter loop is chosen as a basis for the current steering tool embodiment. It consists of three steps:

Kalman gain:

$$K = P^- H'(HP^- H' + R)^{-1} \quad (36)$$

State variables:

$$\hat{\vec{x}} = \hat{\vec{x}}^- + K(z - H\hat{\vec{x}}^-) \quad (37)$$

Error covariance matrix:

$$P = (I - KH)P^- \quad (38)$$

Position Coordinate Errors

Having completed the filter analysis at a new position, its coordinates are given by equation (16). Corresponding one-sigma position errors follow from:

$$\sigma_X = \sqrt{P_{11}} \quad (39)$$

$$\sigma_Y = \sqrt{P_{22}} \quad (40)$$

$$\sigma_Z = \sqrt{P_{33}} \quad (41)$$

Figure 7B:
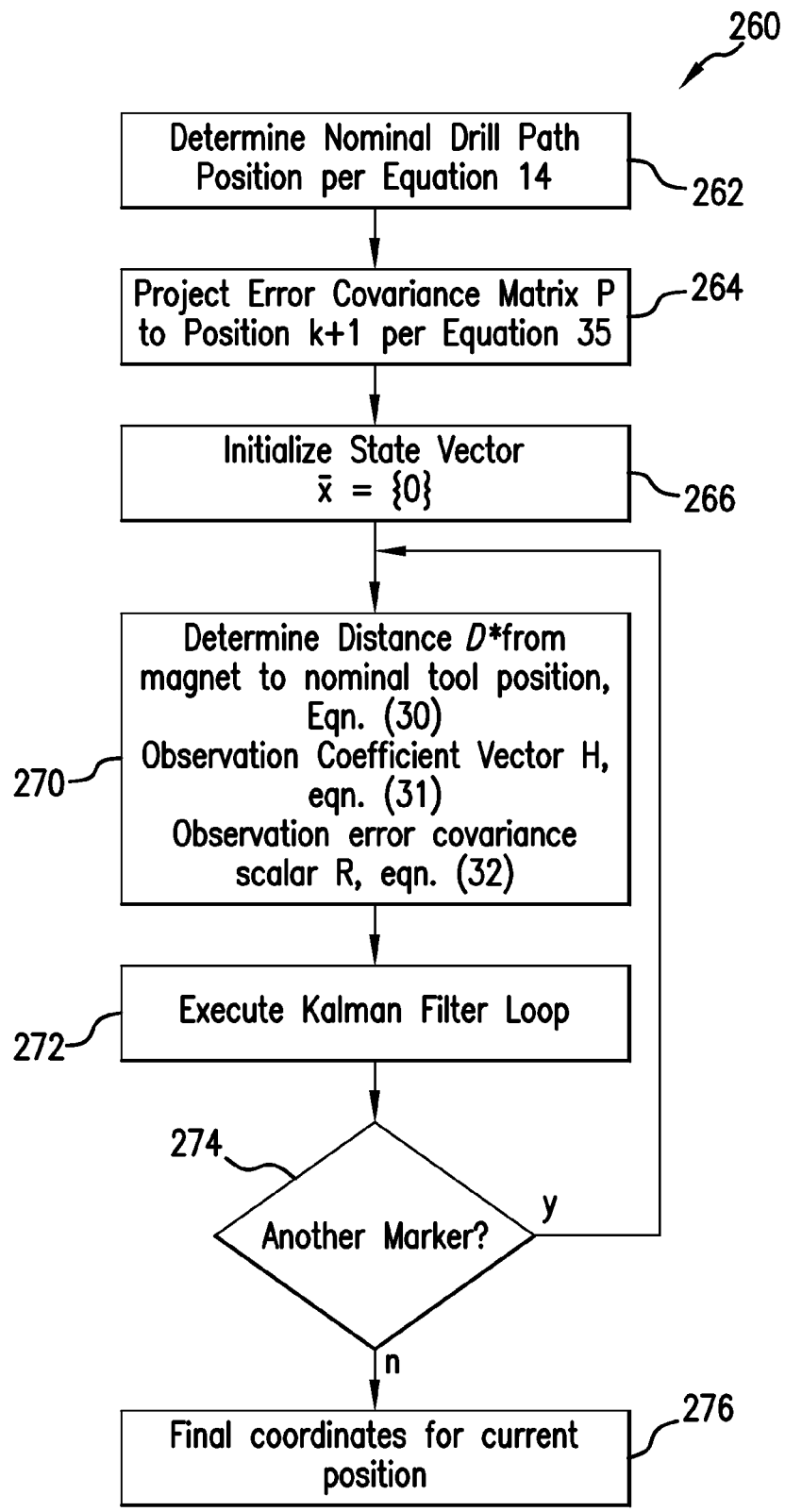
FIG. 7b is a flow diagram which illustrates one possible embodiment of a technique for determining the position of the steering tool using a Kalman filter.

FIG. 7b is a flow diagram, generally indicated by the reference number 260, which illustrates one embodiment of a Kalman filter implementation according to the descriptions above. At 262, the nominal position of the steering tool at k+1 is determined using equation 14. At 264, the error covariance matrix is projected to position k+1 using equation 35. The state vector is initialized at 266. Beginning with step 270, a loop is entered using magnetic measurements associated with one marker. The distance D* between a point on the nominal drill path and the marker is determined per equation 30. The observation coefficient vector H in turn is calculated using equation 31. Equation 32 provides the observation covariance scalar R. At 272, the Kalman filter is executed using equations 36-38. At 274, a determination is made as to whether magnetic information is available that is associated with another marker. If so, execution returns to step 270. If magnetic information from all markers has been processed, step 276 establishes the final coordinates of the current position of the steering tool based on equation 16 and can associate a position error estimate with these coordinates, based on equations 39-41.

Numerical Simulations

Several numerical simulations were performed to estimate positions of the steering tool assisted by up to three rotating magnets. In all cases the steering tool was tracked, moving along a drill-path defined by:

$$0 \le X_{ex} \le 300 \text{ ft} \quad (42)$$

$$Y_{ex} = 15\sin\left(\frac{\pi}{300}X_{ex}\right) \quad (43)$$

$$Z_{ex} = -2Y_{ex} \quad (44)$$

Note that drilling starts at the origin of the global coordinate system. The steering tool reaches a maximum depth of 30 feet and yaws to the side with a maximum lateral displacement of 15 feet before it reaches the target 300 feet out. The above coordinates are exactly known coordinates from which values for pitch, yaw and tool to magnet distances were derived.

Table 1 summarizes random and bias errors that were added to these exact values to generate "measured" data.

TABLE 1

Errors for Generating "Measured" Simulation Data

| | |
|---|---|
| Pitch Error | $\sigma_\phi = 0.25$ deg |
| | $\phi_{bias} = 0.25$ deg |
| Yaw Error | $\sigma_\beta = 0.50$ deg |
| | $\beta_{bias} = 0.50$ deg |
| Drill Rod Length Error | $\sigma_{\Delta s} = 0.01$ ft |
| Distance Error | $D_{bias} = 0.02$ ft |
| | (See also, FIG. 8) |

Figure 8:
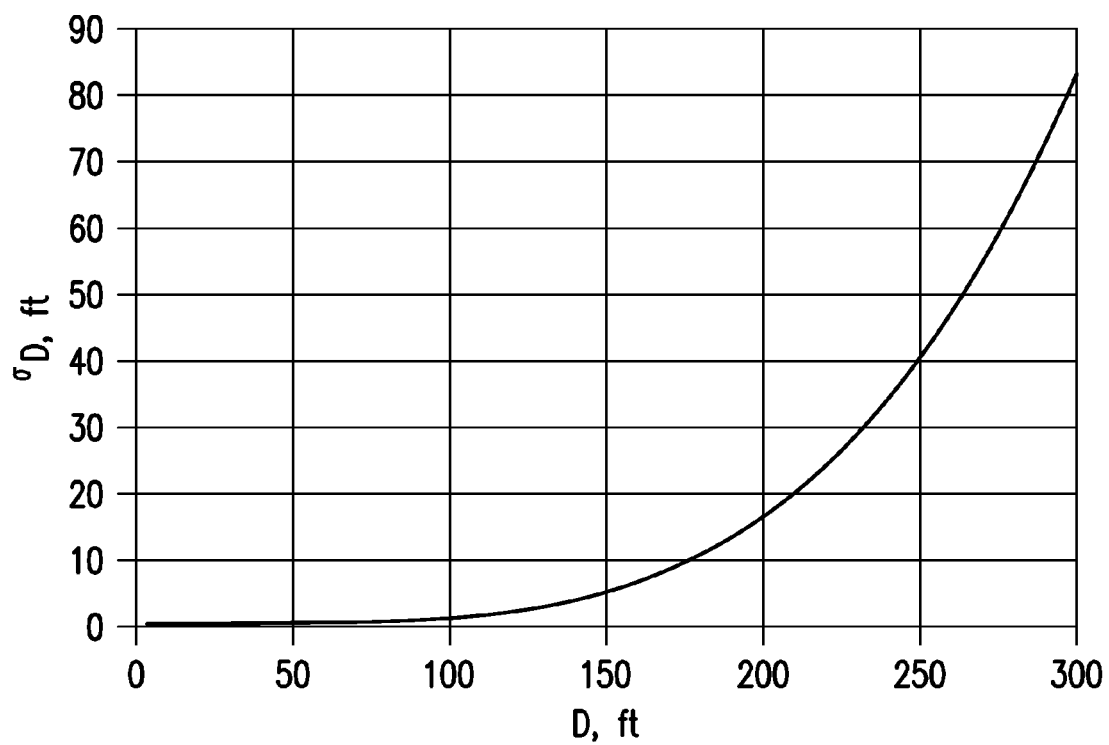
FIG. 8 is a plot of random distance error versus distance.

FIG. 8 sets forth random distance error $\sigma_D$ in feet, plotted against distance D in feet. It is noted that errors were chosen based on empirical measurements with specific pitch and yaw sensors as well as with rotating magnets. Table 2 summarizes the random errors used as input for the filter. Note that the rod length increment error is used only for generating measured data; it is not used by the filter.

TABLE 2

Random Errors Used in Kalman Filter

| | |
|---|---|
| Pitch Error | $\sigma_\phi = 0.5$ deg |
| Yaw Error | $\sigma_\beta = 1$ deg |
| Distance Error | $\sigma_D$ (see FIG. 8) |
| Magnet Position Errors | $\sigma_{X_M} = \sigma_{Y_M} = \sigma_{Z_M} = 0.02$ ft |
| Initial Position Error | $\sigma_{X_1} = \sigma_{Y_1} = \sigma_{Z_1} = 0$ |

FIGS. 9a and 9b are plots against drill string length, in feet, which compare exact with "measured" pitch and yaw angles, respectively, used in all the simulations described below. Exact pitch and yaw values are shown by dotted lines, while measured pitch and yaw values are shown by solid lines. Increments between adjacent measurement positions along the drill-path were approximately three feet.

Figure 10A:
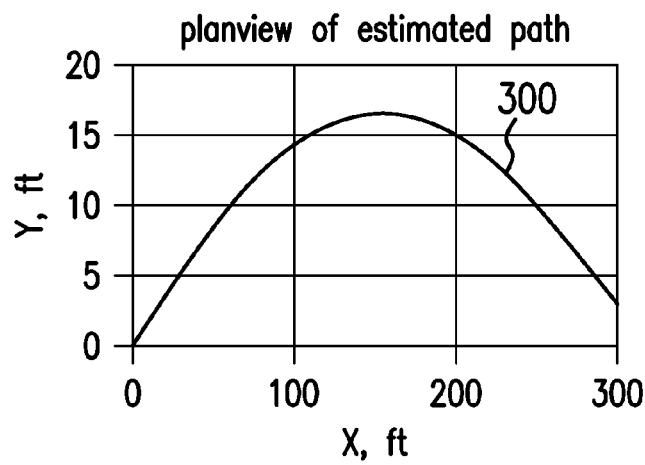
FIG. 10a is a plot in a simulation of estimated Y (lateral) steering tool position with respect to X position, employing a basic steering tool without the use of markers.
Figure 10B:
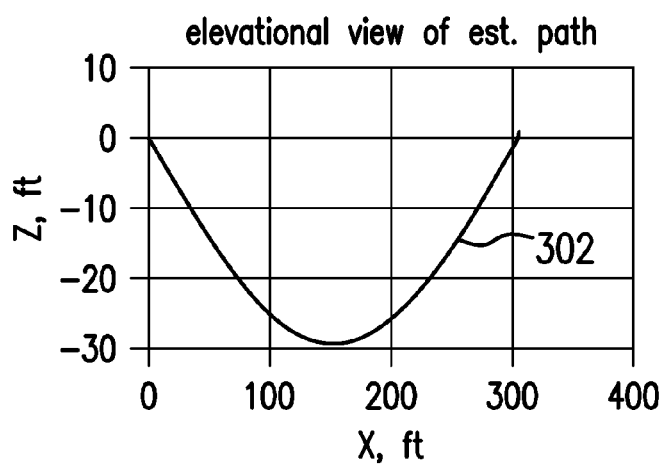
FIG. 10b is a plot in the simulation of estimated Z (elevational) steering tool position with respect to X position, employing a basic steering tool without the use of markers.
Figure 10C:
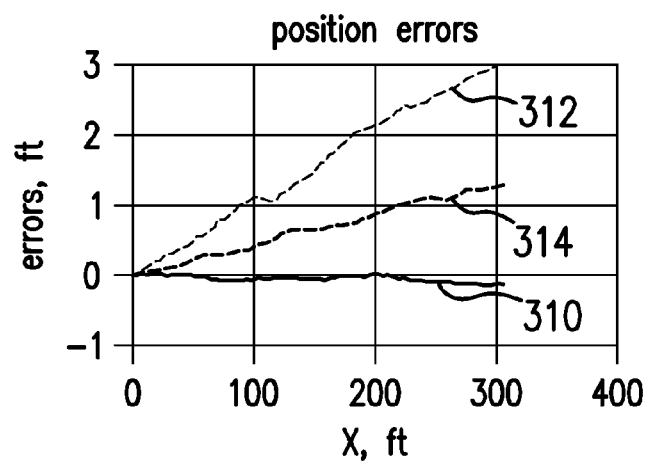
FIG. 10c is a plot, for the simulation of FIGS. 10a and 10b, of steering tool coordinate position error versus X position, which illustrates positional errors for the X, Y and Z axes without the use of markers.

Estimated steering tool positions and position errors are illustrated by FIGS. 10a-c, as an application of the basic steering tool function without the use of markers. It is noted that, in subsequent figures, an increasing number of magnets is added to the system to demonstrate the improvements that are provided through the use of markers. Illustrated position errors are shown as the differences between estimated and exact values. Since "measured" values for pitch and yaw contain bias as well as random components, lateral and vertical position errors are also biased. FIG. 10a is a diagrammatic plan view of the estimated drill path, designated by the reference number 300, whereas FIG. 10b is an elevational view of the estimated drill path, designated by the reference number 302. FIG. 10c illustrates the X coordinate positional error as a solid line 310, the Y coordinate positional error as a dashed line 312 and the Z coordinate positional error as a dotted line 314. In the present example, without the use of magnets, it can be seen that there is a continuously accumulating Y coordinate error, which increases to about three feet upon reaching X=300 feet, the X axis coordinate of target T. The Z coordinate error is over one foot.

Figure 11A:
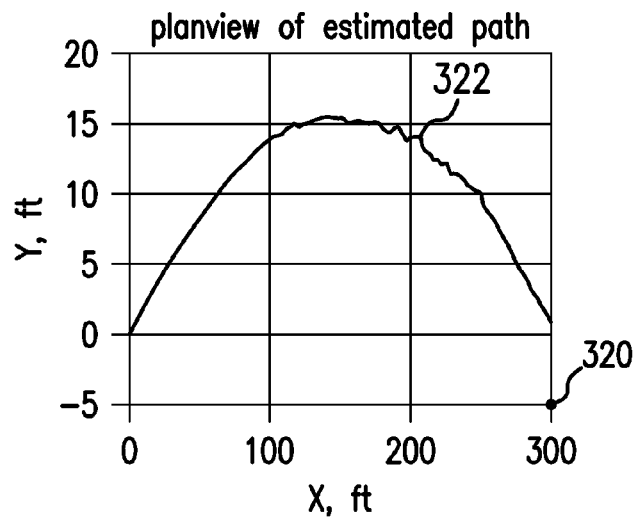
FIG. 11a is a plot in a simulation of estimated Y (lateral) steering tool position with respect to X position, employing a steering tool in conjunction with one marker.
Figure 11B:
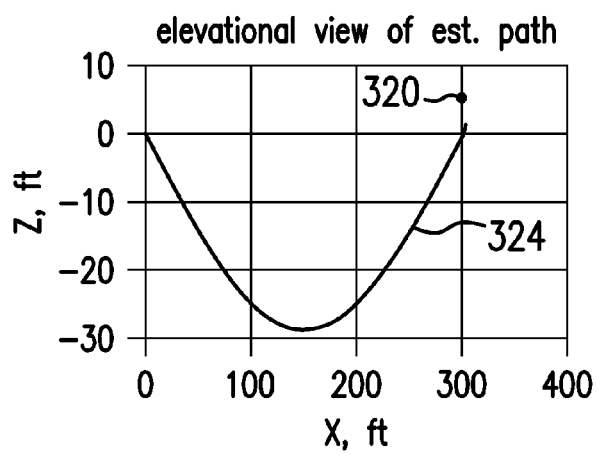
FIG. 11b is a plot in the simulation of estimated Z (elevational) steering tool position with respect to X position, employing the steering tool in conjunction with one marker.
Figure 11C:
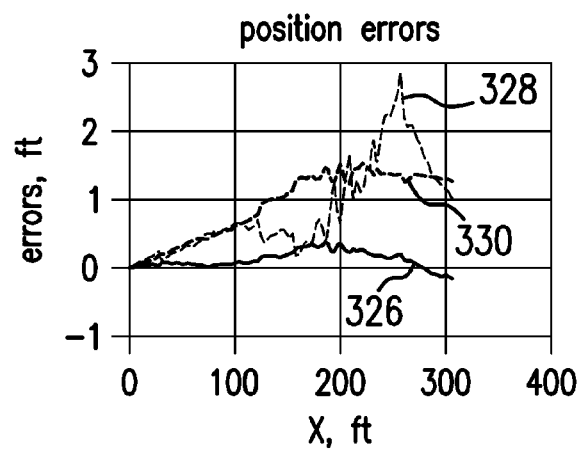
FIG. 11c is a plot, for the simulation of FIGS. 11a and 11b, of steering tool coordinate position error versus X position, which illustrates positional errors for the X, Y and Z axes with the use of one marker.

Referring collectively to FIGS. 11 a-c, simulations are now presented including the use of markers. One marker 320 is used at a location of X=300 ft, Y=-5 ft, and Z=5 ft. FIG. 11a is a diagrammatic plan view of the estimated drill path, designated by the reference number 322, whereas FIG. 11b is an elevational view of the estimated drill path, designated by the reference number 324. FIG. 11c illustrates the X coordinate positional error as a solid line 326, the Y coordinate positional error as a dashed line 328, and the Z coordinate positional error as a dotted line 330. In the present example, with the use of only one magnet near target T, it can be seen that the Y coordinate error is dramatically reduced to just over one foot upon reaching the target X coordinate at 300 feet.

Figure 12A:
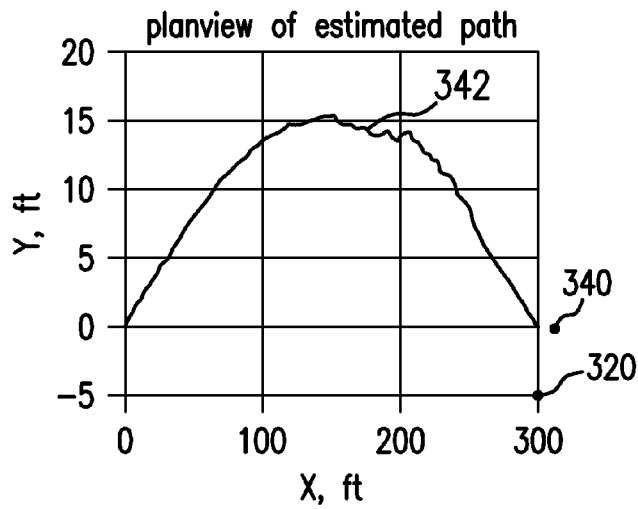
FIG. 12a is a plot in a simulation of estimated Y (lateral) steering tool position with respect to X position, employing a steering tool in conjunction with two markers.
Figure 12B:
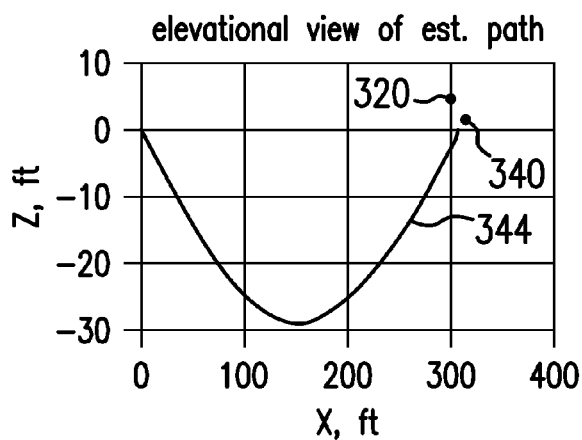
FIG. 12b is a plot in the simulation of estimated Z (elevational) steering tool position with respect to X position, employing the steering tool in conjunction with two markers.
Figure 12C:
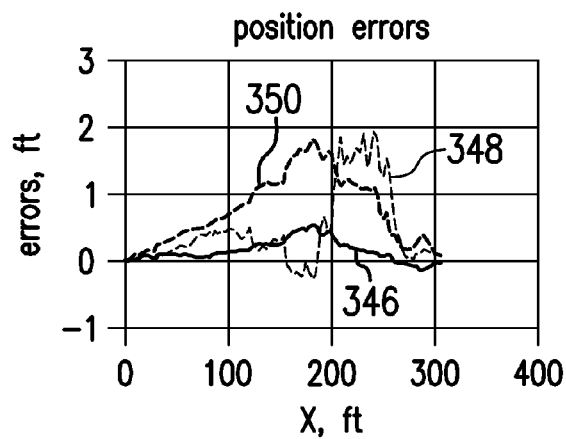
FIG. 12c is a plot, for the simulation of FIGS. 12a and 12b, of steering tool coordinate position error versus X position, which illustrates positional errors for the X, Y and Z axes with the use of two markers.

Referring collectively to FIGS. 12a-c, a second marker 340 is added at a location of X=305 ft, Y=0 ft and Z=5 ft. FIG. 12a is a diagrammatic plan view of the estimated drill path, designated by the reference number 342, whereas FIG. 12b is an elevational view of the estimated drill path, designated by the reference number 344. FIG. 12c illustrates the X coordinate positional error as a solid line 346, the Y coordinate positional error as a dashed line 348, and the Z coordinate positional error as a dotted line 350. In the present example, with the use of two magnets near target T, it can be seen that the Y coordinate error is still further reduced to a relatively small fraction of one foot upon reaching the target X coordinate at 300 feet. Moreover, the X and Z coordinate errors are likewise reduced to a small fraction of one foot upon reaching the target X coordinate at 300 feet.

Figure 13A:
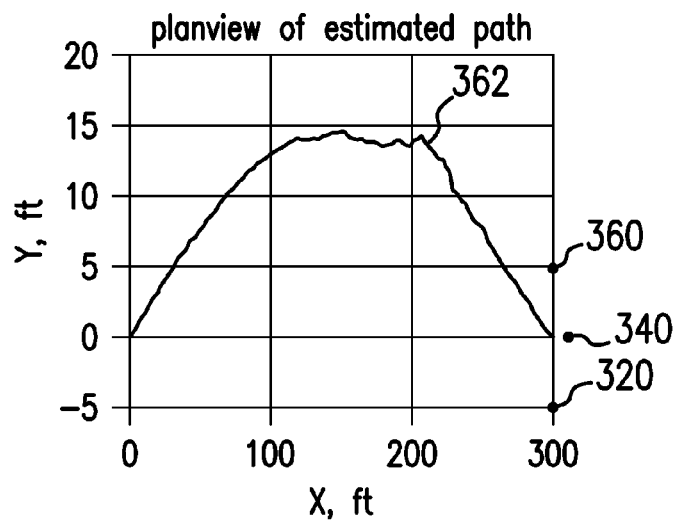
FIG. 13a is a plot in a simulation of estimated Y (lateral) steering tool position with respect to X position, employing a steering tool in conjunction with three markers.
Figure 13B:
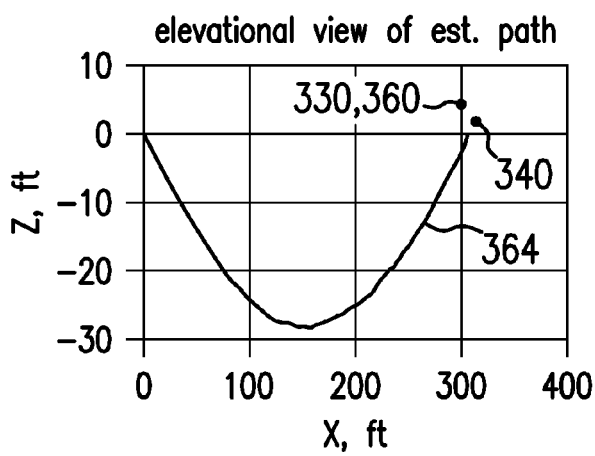
FIG. 13b is a plot in the simulation of estimated Z (elevational) steering tool position with respect to X position, employing the steering tool in conjunction with three markers.
Figure 13C:
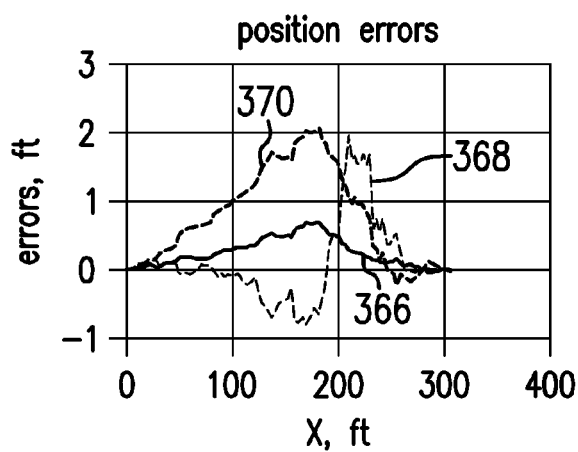
FIG. 13c is a plot, for the simulation of FIGS. 13a and 13b, of steering tool coordinate position error versus X position, which illustrates positional errors for the X, Y and Z axes with the use of three markers.

Referring collectively to FIGS. 13a-c, a third marker 360 is added at a location of X=300 ft, Y=5 ft and Z=5 ft. FIG. 13a is a diagrammatic plan view of the estimated drill path, designated by the reference number 362, whereas FIG. 13b is an elevational view of the estimated drill path, designated by the reference number 364. FIG. 12c illustrates the X coordinate positional error as a solid line 366, the Y coordinate positional error as a dashed line 368, and the Z coordinate positional error as a dotted line 370. In the present example, with the use of three magnets near target T, it can be seen that the X, Y and Z coordinate errors are reduced to a very small fraction of one foot upon reaching the target X coordinate at 300 feet. In view of the foregoing, the use of two or three markers proximate to a point of interest on the drill path (such as the target) enables a high precision guidance of the steering tool to a target at least 300 feet out from the point of drill begin, or enables high precision steering relative to some point of interest along the drill path at least 300 feet out.

It should be appreciated that, in the aforedescribed numerical simulations, errors defined as the difference between estimated and exact positions can be calculated, since exact drill-path coordinates are known. This type of error can not be calculated during actual drill-head tracking. Accordingly, a different type of error estimate is used for actual drilling. The Kalman filter analysis provides such an error estimate in the form of standard deviations of position coordinates. In this regard, FIGS. 14a-c illustrate the two types of position errors for the drill-path of FIGS. 13a-b with three markers placed near the target. The solid lines denote the +1 sigma position error provided by the Kalman filter analysis, whereas the dashed lines represent the corresponding −1 sigma errors. For comparison, the position errors of FIG. 13c, defined as the difference between estimated and exact positions, are also shown in FIGS. 14a-c. As seen, position errors expressed in terms of standard deviations vary smoothly along the drill-path since they are based on a statistical measure. In contrast, estimated positions and, hence, the errors shown as dotted lines in FIGS. 14a-c are based on one set of partly random measurements resulting in an irregular distribution of position errors. Repeating the Kalman filter analysis with a different set of random measurements would produce different error distributions of this type. Numerical simulations were performed with $c_e=16$.

Attention is now directed to FIGS. 15 and 16 for purposes of describing additional aspects of the present disclosure. FIG. 15 illustrates a plan view of a drilling region 400 having a concluding section of an intended drill path 402 defined therein. Further, a first inground obstacle 404 and a second inground obstacle 406 are shown in relation to intended path 402. As can be seen, intended path 402 has been specifically designed to avoid inground obstacles 404 and 406. Such path design can be based on any knowledge of inground features that should be avoided and can include a reliance on any suitable resource including but not limited to utility surveys, available design drawings and exploratory excavations. Moreover, inground obstacles 404 and 406 are intended to represent any type of feature within the ground that should be avoided.

Still referring to FIGS. 14 and 15, an exemplary plurality of markers 140a-e is distributed along intended path 402 such that markers 140a and 140b are in the vicinity of obstacle 404, marker 104c is in the vicinity of obstacle 406, and markers 140d and 140e are in the vicinity of target T. It should be appreciated that orientation of the markers is arbitrary so long as the steering tool, on the intended path and proximate to some inground feature of interest, is capable of receiving at least the magnetic field that is emanated by the markers in its general vicinity. As seen above, with each marker that is added proximate to target T, there is a corresponding increase in steering tool accuracy. That is, the steering tool tracks the intended path with proportionally increasing accuracy. Placement of markers proximate to points of interest, as illustrated, likewise produces a corresponding increase in accuracy along any portion of the intended path that is exposed to the magnetic field that is emanated by that marker. In this way, an enhanced steering accuracy, of a selective degree, can be provided at any desired point or points along the intended path. Accordingly, a highly advantageous customized steering accuracy is provided along the intended path. In this regard, as discussed above, the described technique readily accommodates receiving signals from any number of markers at any given point along the intended path or receiving no marker signals for some portions of the path, such as might be the case at a point 410 midway between markers 140c and 140d of the present example.

Even though the present example illustrates the use of five markers, fewer markers may actually be necessary since the markers can be moved along the intended drill path responsive to the progression of the steering tool. For example, after the steering tool passes obstacle 404, marker 140a can be moved to the position of marker 140c. At a suitable time, marker 140b can be moved to the position of marker 140d. Once the steering tool passes obstacle 406, marker 140a can then be moved to the illustrated position of marker 140e. Accordingly, long drill runs can be made with as few as one or two markers.

Applicants consider that sweeping advantages are provided over the state-of-the-art with respect to steering tool systems and methods. While there are systems in the prior art that use rotating magnet signals, it should be apparent from the detailed descriptions above that providing the capability to use rotating magnet signals in the context of a steering tool system is neither trivial nor obvious. In this regard, Applicants are unaware of any prior art use of a rotating magnet signal in the context of a steering tool system and, particularly, with such flexibility and ease of use where the rotating magnet field markers can not only be arbitrarily placed, but arbitrarily oriented.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a system including a steering tool that is intended to form an underground bore along an intended path by steering and said steering tool is moved by a drill string, beginning from a starting position, a method comprising:

providing a sensing arrangement, forming one part of the steering tool, for detecting a pitch orientation and a yaw orientation of the steering tool such that each of the pitch orientation and the yaw orientation, as detected, are subject to a measurement error;

moving the steering tool sequentially through a series of spaced apart positions along said underground bore;

characterizing each of the spaced apart positions by a measured extension of said drill string;

arranging at least one marker, proximate to the intended path, for transmitting a rotating dipole field such that at least a portion of the intended path is exposed to the rotating magnetic dipole;

receiving the dipole field using a receiver that forms another part of the steering tool, with the steering tool at a current one of said spaced apart positions on said portion of the intended path, to produce magnetic information; and configuring a processor for using the detected pitch orientation, the detected yaw orientation and the measured extension of the drill string in conjunction with the magnetic information, corresponding to the current one of the positions of the steering tool, to determine a current location of the steering tool, relative to said starting position, with a given accuracy such that using only the detected pitch orientation, the detected yaw orientation and the measured extension of the drill string to determine the current location, without the magnetic information, results in a reduced accuracy in the determination of the current location as said measurement error accumulates with each successive position in said series of positions, as compared to the given accuracy and for determining an estimated positional error for the current location of the steering tool and to cooperate with a display for displaying the estimated positional error.

2. The method of claim 1 including using no more than two of said markers at any given time.

3. In a system including a steering tool that is intended to form an underground bore along an intended path by steering and said steering tool is moved by a drill string, beginning from a starting position, a method comprising:

providing a sensing arrangement, forming one part of the steering tool, for detecting a pitch orientation and a yaw orientation of the steering tool such that each of the pitch orientation and the yaw orientation, as detected, are subject to a measurement error;

moving the steering tool sequentially through a series of spaced apart positions along said underground bore;

characterizing each of the spaced apart positions by a measured extension of said drill string;

arranging at least one marker, proximate to the intended path, for transmitting a rotating dipole field such that at least a portion of the intended path is exposed to the rotating magnetic dipole;

receiving the dipole field using a receiver that forms another part of the steering tool, with the steering tool at a current one of said spaced apart positions on said portion of the intended path, to produce magnetic information; and configuring a processor for using the detected pitch orientation, the detected yaw orientation and the measured extension of the drill string in conjunction with the magnetic information, corresponding to the current one of the positions of the steering tool, to determine a current location of the steering tool, relative to said starting position, with a given accuracy such that using only the detected pitch orientation, the detected yaw orientation and the measured extension of the drill string to determine the current location, without the magnetic information, results in a reduced accuracy in the determination of the current location as said measurement error accumulates with each successive position in said series of positions, as compared to the given accuracy and for determining an estimated positional error for the current location of the steering tool, and to cooperate with a display for displaying the estimated positional error and the current location of the steering tool.

4. In a system including a steering tool that is intended to form an underground bore along an intended path by steering and said steering tool is moved by a drill string, beginning from a starting position, a method comprising:

providing a sensing arrangement, forming one part of the steering tool, for detecting a pitch orientation and a yaw orientation of the steering tool such that each of the pitch orientation and the yaw orientation, as detected, are subject to a measurement error;

moving the steering tool sequentially through a series of spaced apart positions along said underground bore;

characterizing each of the spaced apart positions by a measured extension of said drill string;

arranging at least one marker, proximate to the intended path, for transmitting a rotating dipole field such that at least a portion of the intended path is exposed to the rotating magnetic dipole field:

receiving the dipole field using a receiver that forms another part of the steering tool, with the steering tool at a current one of said spaced apart positions on said portion of the intended path, to produce magnetic information; and configuring a processor to utilize a Kalman filter loop for determining the current location of the steering tool by using the detected pitch orientation, the detected yaw orientation and the measured extension of the drill string in conjunction with the magnetic information, corresponding to the current one of the positions of the steering tool, to determine the current location of the steering tool, relative to said starting position, with a given accuracy such that using only the detected pitch orientation, the detected yaw orientation and the measured extension of the drill string to determine the current location, without the magnetic information, results in a reduced accuracy in the determination of the current location as said measurement error accumulates with each successive position in said series of positions, as compared to the given accuracy and wherein said arranging includes providing a plurality of said markers for positioning proximate to said intended path and executing said Kalman filter loop responsive to a set of magnetic information that is produced by the steering tool for each of said markers such that the set of magnetic information for one of the markers is individually used with each pass through the Kalman filter loop.

5. The method of claim 4 wherein each pass through the Kalman filter loop increasingly converges on an actual position of the steering tool.

6. In a system including a steering tool that is intended to form an underground bore along an intended path by steering and said steering tool is moved by a drill string, beginning from a starting position, a method comprising:

a) providing a sensing arrangement, forming one part of the steering tool, for detecting a pitch orientation and a yaw orientation of the steering tool such that each of the pitch orientation and the yaw orientation, as detected, are subject to a measurement error;

b) moving the steering tool sequentially through a series of spaced apart positions to form said underground bore;

c) characterizing each of the spaced apart positions by a measured extension of said drill string, a detected pitch orientation and a detected yaw orientation such that a current location of the steering tool is determinable corresponding to any given one of the spaced apart positions with at least a given accuracy subject at least to said measurement error which accumulates with successive movement through the series of spaced apart positions;

d) identifying at least one portion of said intended path along which an enhanced accuracy of a determination of the current location of the steering tool is desired for any of the spaced apart positions that correspond to said portion of the intended path such that the enhanced accuracy is greater than the given accuracy;

e) arranging at least one marker proximate to said portion of said intended path for transmitting a rotating dipole field such that at least the portion of the intended path is exposed to the rotating dipole field;

f) receiving the rotating dipole field using a receiver that forms part of the steering tool to produce magnetic information for at least a given one of said spaced apart positions corresponding to said portion of the intended path; and g) determining the current location of the steering tool with said enhanced accuracy for said given one of the spaced apart positions, based on the detected pitch orientation, the detected yaw orientation, and the measured extension of the drill string in conjunction with the magnetic data to compensate for the accumulation of said measurement error.

7. The method of claim 6 further comprising:

h) moving the steering tool to an additional given one of the spaced apart locations corresponding to said portion of the intended path;

i) receiving the rotating dipole field using the receiver to produce additional magnetic information for the additional given one of said spaced apart positions corresponding to said portion of the intended path; and j) determining the current location of the steering tool with said enhanced accuracy for the additional given one of the spaced apart positions based on (i) the detected pitch orientation, (ii) the detected yaw orientation, (iii) the measured extension of the drill string and (iv) the magnetic information corresponding to the additional given one of the spaced apart positions.

8. The method of claim 7 further comprising:

k) repeating (h) through (j) for further additional given ones of the spaced apart positions corresponding to the portion of the intended path.

9. The method of claim 6 including operating in a first mode using the detected pitch orientation, the detected yaw orientation and the measured extension of the drill string to determine the current location of the steering tool corresponding to any given one of the spaced apart positions with said given accuracy that is subject to said measurement error as said measurement error accumulates with each successive position in said series of positions and defaulting to a second mode using the detected pitch orientation, the detected yaw orientation, the measured extension of the drill string and the magnetic information, when the magnetic information is received along said portion of the intended path, to determine the current location of the steering tool with said enhanced accuracy that is greater than said given accuracy to compensate for the accumulation of said measurement error.

10. The method of claim 6 including using a set of ordinary differential equations to determine a change in the position of the steering tool along the drill-path as a function of measured pitch and yaw and as part of determining the current location of the steering tool.

11. The method of claim 10 including using a distance measurement equation in conjunction with said set of ordinary differential equations with the distance equation representing a distance between said marker and said receiver of the steering tool as part of determining the current location of the steering tool.

* * * * *